United States Patent
Minegishi et al.

(10) Patent No.: US 11,164,111 B2
(45) Date of Patent: Nov. 2, 2021

(54) ELECTRIC POWER MANAGEMENT SYSTEM FOR REDUCING LARGE AND RAPID CHANGE IN POWER RECEIVED FROM ELECTRICITY DELIVERY SYSTEM

(71) Applicant: Panasonic Intellectual Property Management Co., Ltd., Osaka (JP)

(72) Inventors: Akira Minegishi, Osaka (JP); Junichi Kanou, Osaka (JP); Noriaki Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 16/310,177

(22) PCT Filed: Jun. 14, 2017

(86) PCT No.: PCT/JP2017/021997
§ 371 (c)(1),
(2) Date: Dec. 14, 2018

(87) PCT Pub. No.: WO2017/217466
PCT Pub. Date: Dec. 21, 2017

(65) Prior Publication Data
US 2019/0340545 A1 Nov. 7, 2019

(30) Foreign Application Priority Data
Jun. 17, 2016 (JP) .............................. JP2016-120809

(51) Int. Cl.
*H02J 3/00* (2006.01)
*G06Q 10/04* (2012.01)
(Continued)

(52) U.S. Cl.
CPC .............. *G06Q 10/04* (2013.01); *G01W 1/10* (2013.01); *G06N 3/04* (2013.01); *G06Q 30/0224* (2013.01);
(Continued)

(58) Field of Classification Search
CPC .... G06Q 10/04; G06Q 30/0224; G06Q 50/06; G01W 1/10; H02J 3/32; H02J 3/003; H04L 67/1012; B60L 2240/80
See application file for complete search history.

(56) References Cited

U.S. PATENT DOCUMENTS 8,872,379 B2 * 10/2014 Ruiz ........................ B60L 58/21
307/66
10,033,220 B1 * 7/2018 Nguyen .................. H01F 38/00
(Continued)

FOREIGN PATENT DOCUMENTS

| EP | 3133713 A1 | 2/2017 |
|---|---|---|
| JP | 5402566 B2 | 1/2014 |

(Continued)

OTHER PUBLICATIONS

International Preliminary Report on Patentability issued in Application No. PCT/JP2017/021997 dated Dec. 18, 2018.
(Continued)

*Primary Examiner* — Gary Collins
(74) *Attorney, Agent, or Firm* — McDermott Will & Emery LLP

(57) ABSTRACT

A long-term predictor circuit predicts a long-term predicted power indicating temporal variations in consumed power of a customer, using a long-term prediction model indicating the variations for each moment of clock times. A short-term predictor circuit predicts a short-term predicted power using a short-term prediction model indicating the variations over a time interval before and after a change in a consumed
(Continued)

power of each load apparatus, based on the variations over a time interval immediately before a current time, the short-term predicted power indicating the variations over a time interval immediately after the current time. A controller circuit controls charging and discharging of a battery apparatus by setting a charging power or a discharging power based on the long-term predicted power, and controls discharging of the battery apparatus by setting a discharging power based on the short-term predicted power.

25 Claims, 11 Drawing Sheets

(51) Int. Cl.
G01W 1/10 (2006.01)
G06N 3/04 (2006.01)
G06Q 30/02 (2012.01)
H02J 3/32 (2006.01)
H04L 29/08 (2006.01)
G06Q 50/06 (2012.01)

(52) U.S. Cl.
CPC ............ *H02J 3/32* (2013.01); *H04L 67/1012* (2013.01); *B60L 2240/80* (2013.01); *G06Q 50/06* (2013.01); *H02J 3/003* (2020.01)

(56) References Cited

U.S. PATENT DOCUMENTS

| | | | |
|---|---|---|---|
| 2005/0137764 A1* | 6/2005 | Alvarez-Troncoso | G05B 13/026 701/36 |
| 2005/0138929 A1* | 6/2005 | Enis | F24S 60/30 60/641.8 |
| 2010/0023174 A1 | 1/2010 | Nagata et al. | |
| 2010/0127664 A1* | 5/2010 | Paice | H02J 3/32 320/134 |
| 2013/0060392 A1* | 3/2013 | Wang | H02J 3/382 700/291 |
| 2013/0274935 A1* | 10/2013 | Deshpande | H02J 3/28 700/291 |
| 2014/0058571 A1* | 2/2014 | Hooshmand | G05B 15/02 700/286 |
| 2015/0153394 A1* | 6/2015 | Carlson | H02J 3/32 700/291 |
| 2015/0214771 A1* | 7/2015 | Peterson | G05B 13/021 307/20 |
| 2015/0303690 A1* | 10/2015 | Miyazaki | H02J 3/32 700/291 |
| 2015/0338869 A1* | 11/2015 | Behrangrad | G05B 15/02 700/291 |
| 2016/0211664 A1* | 7/2016 | Subbotin | H02J 3/381 |
| 2016/0241042 A1* | 8/2016 | Mammoli | H02J 7/0068 |
| 2016/0329707 A1* | 11/2016 | Carlson | H02J 3/14 |
| 2016/0359328 A1* | 12/2016 | Hunt | H02J 7/34 |
| 2017/0264135 A1* | 9/2017 | Hashimoto | G06Q 50/06 |
| 2017/0373500 A1* | 12/2017 | Shafi | G06N 3/084 |
| 2018/0062388 A1* | 3/2018 | Mathiesen | H02J 3/28 |
| 2018/0166880 A1* | 6/2018 | Hooshmand | G06N 20/00 |
| 2018/0175660 A1* | 6/2018 | Hara | H02J 7/0068 |
| 2019/0140465 A1* | 5/2019 | Hooshmand | G06Q 50/06 |

FOREIGN PATENT DOCUMENTS

| | | |
|---|---|---|
| JP | 2016-015857 A | 1/2016 |
| WO | 2008/117392 A1 | 10/2008 |
| WO | 2014/175374 A1 | 10/2014 |
| WO | 2015/159951 A1 | 10/2015 |
| WO | 2016/067469 A1 | 5/2016 |

OTHER PUBLICATIONS

International Search Report issued in Application No. PCT/JP2017/021997 dated Aug. 1, 2017, with English translation.

* cited by examiner

ELECTRIC POWER MANAGEMENT SYSTEM FOR REDUCING LARGE AND RAPID CHANGE IN POWER RECEIVED FROM ELECTRICITY DELIVERY SYSTEM

RELATED APPLICATIONS

This application is the U.S. National Phase under 35 U.S.C. § 371 of International Application No. PCT/JP2017/021997, filed on Jun. 14, 2017, which in turn claims the benefit of Japanese Application No. 2016-120809, filed on Jun. 17, 2016, the disclosures of which are incorporated by reference herein.

TECHNICAL FIELD

The present disclosure relates to a controller apparatus for an battery apparatus of a customer, the customer being connected to an electricity delivery system and provided with a plurality of load apparatuses and at least one battery apparatus. The present disclosure also relates to an electric power management system for such a customer, a power grid management system for a power grid including a plurality of such customers, and a power network management system for a power network including a plurality of such power grids.

BACKGROUND ART

There are known electric power management systems provided at a customer, the customer being connected to an electricity delivery system and provided with a plurality of load apparatuses and at least one battery apparatus (see Patent Documents 1 to 3). The electric power management system may be provided with a power generator apparatus (such as solar cells) of the customer.

CITATION LIST

Patent Documents

PATENT DOCUMENT 1: Japanese Patent Laid-open Publication No. JP 2016-015857 A
PATENT DOCUMENT 2: Japanese Patent No. JP 5402566 B2
PATENT DOCUMENT 3: International Publication No. WO 2014/175374 A1

SUMMARY OF INVENTION

Technical Problem

When a consumed power of one of load apparatuses of a customer changes, an entire consumed power of the customer also changes. For example, when one of the load apparatuses of the customer is turned on, the entire consumed power of the customer changes largely and rapidly. If a peak power received from an electricity delivery system exceeds a threshold contracted with an electric power company, then a unit price of electricity increases. In addition, if the large and rapid change in the entire consumed power of the customer affects the electricity delivery system, and degrades the quality of power transmitted through the electricity delivery system. Accordingly, it is required to determine magnitudes of charging power and discharging power of an battery apparatus so as to reduce a large and rapid change in the power received from the electricity delivery system.

The present disclosure provides a controller apparatus for an battery apparatus of a customer, the customer being connected to an electricity delivery system and provided with a plurality of load apparatuses and at least one battery apparatus, the controller apparatus determining magnitudes of charging power and discharging power of the battery apparatus so as to reduce a large and rapid change in power received from an electricity delivery system.

The present disclosure also provides an electric power management system for such a customer, a power grid management system for a power grid including a plurality of such customers, and a power network management system for a power network including a plurality of such power grids.

Solution to Problem

According to an aspect of a controller apparatus for an battery apparatus, a controller apparatus for an battery apparatus of a customer is provided, the customer being connected to an electricity delivery system and provided with a plurality of load apparatuses and at least one battery apparatus. The controller apparatus is provided with: a first predictor circuit, a second predictor circuit, and a controller circuit. The first predictor circuit predicts a first predicted power using a first prediction model, the first prediction model indicating temporal variations in an entire consumed power of the customer for each moment of clock times, and the first predicted power indicating the temporal variations in the entire consumed power of the customer. The second predictor circuit predicts a second predicted power using a second prediction model, the second prediction model indicating the temporal variations in the entire consumed power of the customer over a first time interval before and after a change in a consumed power of each of the plurality of load apparatuses, the second predicted power being predicted based on the temporal variations in the entire consumed power of the customer over a second time interval immediately before a current time, and the second predicted power indicating the temporal variations in the entire consumed power of the customer over a third time interval immediately after the current time. The controller circuit controls charging and discharging of the battery apparatus by setting a charging power or a discharging power per a fourth time interval based on the first predicted power, and controls discharging of the battery apparatus by setting a discharging power per a fifth time interval shorter than the fourth time interval based on the second predicted power.

Advantageous Effects of Invention

According to the present disclosure, it is possible to determine magnitudes of charging power and discharging power of an battery apparatus of a customer so as to reduce a large and rapid change in power received from an electricity delivery system, the customer being connected to an electricity delivery system and provided with a plurality of load apparatuses and at least one battery apparatus.

Figure 1:
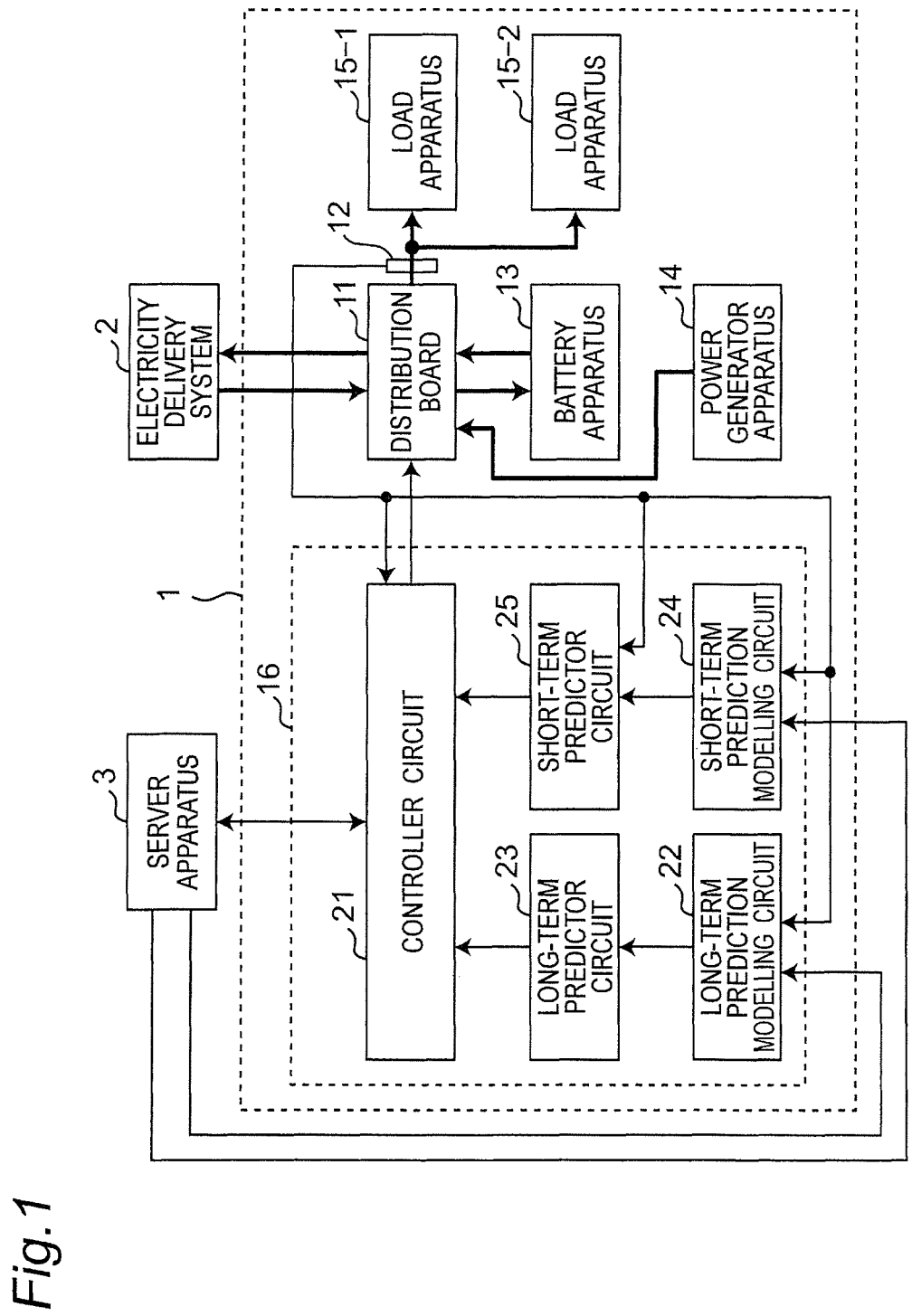
FIG. 1 is a block diagram showing a configuration of an electric power management system of a customer 1 according to a first embodiment.

DESCRIPTION OF EMBODIMENTS (Prehistory of Present Disclosure)

At first, we mention the circumstances leading the present inventors to achieve the present disclosure.

Feed-in Tariff Scheme (FIT) in Japan for renewable energy is scheduled to end in 2019. Therefore, it is expected that a customer provided with solar cells will consume more power generated by the customer itself, and more battery apparatuses will be needed to efficiently consume the generated power.

A conventional electric power management system determines magnitudes of charging power and discharging power of an battery apparatus in accordance with passive feedback control, for example, so as to achieve power balancing every 30 minutes, or in accordance with a generated power of a power generator apparatus. The conventional electric power management system can not rapidly control the magnitudes of charging power and discharging power of the battery apparatus in a cycle shorter than 30 minutes. In addition, the conventional electric power management system can not actively control the magnitudes of the powers, by considering a future consumed power, except when charging at night.

The battery apparatus requires a high initial investment cost, and recovery of the investment cost is difficult, or takes a very long time. Accordingly, it is desired to maximize an effect of using the battery apparatus on reduction of electricity costs.

For example, according to Patent Document 1, in order to maximize the effect of using the battery apparatus on reduction of electricity costs, power supplied from the electricity delivery system is reduced so as to reduce a base rate of the contracted electricity rate. Specifically, a peak power from the electricity delivery system is reduced by controlling charging and discharging of the battery apparatus in advance based on prediction data on a consumed power, such that the power from the electricity delivery system falls to or below an upper limit. For a time slot when the consumed power reaches, or is predicted to reach, an upper limit, a difference between the consumed power and the upper limit is stored in the battery apparatus, before a time slot when the consumed power discharged from the battery apparatus is predicted to exceed an upper limit, thus obtaining a required electric energy to be discharged.

In order to control the discharging power so as to follow a large and rapid change in the consumed power, it is necessary to predict short-term temporal variations in the consumed power. The invention of Patent Document 1 only uses a prediction of the consumed power for each time slot, and therefore, can not follow a short-term, large and rapid change in the consumed power.

Accordingly, it is required to control charging and discharging of the battery apparatus so to reduce a large and rapid change in power received from the electricity delivery system.

Based on the above findings and considerations, the present inventors have achieved aspects of the invention described below.

Hereinafter, embodiments of the present disclosure will be described with reference to the drawings. Additionally, in the following embodiments, similar components are denoted by the same reference signs.

First Embodiment

FIG. 1 is a block diagram showing a configuration of an electric power management system of a customer 1 according to a first embodiment. The customer 1 is provided with a distribution board 11, an electricity meter 12, an battery apparatus 13, a power generator apparatus 14, load apparatuses 15-1, 15-2, and a controller apparatus 16. The customer 1 is connected to an electricity delivery system 2 and a server apparatus 3.

The distribution board 11 transmits power among the electricity delivery system 2, the battery apparatus 13, the power generator apparatus 14, and the load apparatuses 15-1, 15-2, under control of the controller apparatus 16. In one case, the distribution board 11 transmits power received from the electricity delivery system 2, to the battery apparatus 13 and/or the load apparatuses 15-1, 15-2. In another case, the distribution board 11 transmits power received from the battery apparatus 13, to the load apparatuses 15-1, 15-2 and/or the electricity delivery system 2. In yet another case, the distribution board 11 transmits power received from the power generator apparatus 14, to the battery apparatus 13, the load apparatuses 15-1, 15-2, and/or the electricity delivery system 2.

The electricity meter 12 measures an entire consumed power of the customer 1 (that is, a total consumed power of the load apparatuses 15-1, 15-2), and notifies the controller apparatus 16 of the measured consumed power.

The battery apparatus 13 is charged with power generated by the power generator apparatus 14 or power received from the electricity delivery system 2, and the battery apparatus 13 discharges and transmits the charged power to the load apparatuses 15-1, 15-2 or the electricity delivery system 2. The battery apparatus 13 is provided with a battery, an AC/DC power converter circuit, and a DC/AC power converter circuit. The battery apparatus 13 may be an electric vehicle.

The power generator apparatus 14 may be, for example, solar cells, or other power supplies. The power generator apparatus 14 is provided with a DC/AC power converter circuit.

The load apparatuses 15-1, 15-2 are any electric equipment, such as lighting equipment, an air conditioner, cooking equipment, a television apparatus, a personal computer, or an electric vehicle, etc. Hereinafter, the load apparatuses 15-1, 15-2 may be collectively referred to as the load apparatus 15. FIG. 1 and the other drawings show two load apparatuses 15-1, 15-2, but the customer 1 may be provided with any number of load apparatuses.

The controller apparatus 16 is provided with a controller circuit 21, a long-term prediction modelling circuit 22, a long-term predictor circuit 23, a short-term prediction modelling circuit 24, and a short-term predictor circuit 25.

The controller circuit 21 controls charging and discharging of the battery apparatus 13.

The long-term prediction modelling circuit 22 produces a long-term prediction model indicating temporal variations in the entire consumed power of the customer 1 for each moment of clock times. The long-term prediction modelling circuit 22 produces the long-term prediction model based on temporal variations in the entire consumed power of the customer 1 measured by the electricity meter 12. When producing the long-term prediction model, the long-term prediction modelling circuit 22 may optionally use other information obtained from the server apparatus 3 (such as temporal variations in consumed powers of other customers). The long-term prediction model is obtained by calculating an average of the entire consumed power of the customer 1 over several days, for example, for each time of day or for each time slot of day (for example, every 30 minutes or every one hour). Using the long-term prediction model, hourly average powers can be predicted for one day with an error of 20% or less. The long-term prediction model may be obtained for each day of week, each month, and/or each season.

The long-term predictor circuit 23 predicts a long-term predicted power using the long-term prediction model, the long-term predicted power indicating the temporal variations in the entire consumed power of the customer 1.

In the specification, the long-term prediction model may be referred to as a "first prediction model", the long-term predicted power may be referred to as a "first predicted power", the long-term prediction modelling circuit 22 may be referred to as a "first prediction modelling circuit", and the long-term predictor circuit 23 may be referred to as a "first predictor circuit".

The short-term prediction modelling circuit 24 produces a short-term prediction model indicating the temporal variations in the entire consumed power of the customer 1 over a first time interval before and after a change in a consumed power of each of the load apparatuses 15. The short-term prediction model indicates, for example, the temporal variations in the entire consumed power of the customer 1 over the first time interval before and after turning on each of the load apparatuses 15. In addition, for example, in the case where the load apparatus 15 has a plurality of operation modes with different consumed powers, the short-term prediction model may indicate the temporal variations in the entire consumed power of the customer 1 over the first time interval before and after changing its operation mode. For example, in the case where the load apparatus 15 is an air conditioner, cooking equipment, or the like, the plurality of operation modes correspond to a plurality of different configurable temperatures. The consumed power of each of the load apparatuses 15 may be changed according to user operations, timer controls, or a predetermined sequence. The short-term prediction model is characterized by a magnitude of a peak consumed power, a time length during which a peak or average consumed power exceeds a threshold, a time slot when turning on the load apparatus 15, and the like. The short-term prediction modelling circuit 24 produces the short-term prediction model based on the temporal variations in the entire consumed power of the customer 1 measured by the electricity meter 12.

When producing the short-term prediction model, the short-term prediction modelling circuit 24 may optionally use other information obtained from the server apparatus 3 (such as temporal variations in consumed powers of other customers).

The short-term predictor circuit 25 predicts a short-term predicted power using the short-term prediction model, based on the temporal variations in the entire consumed power of the customer 1 over a second time interval immediately before a current time, the short-term predicted power indicating the temporal variations in the entire consumed power of the customer 1 over a third time interval immediately after the current time.

In the specification, the short-term prediction model may be referred to as a "second prediction model", the short-term predicted power may be referred to as a "second predicted power", the short-term prediction modelling circuit 24 may be referred to as a "second prediction modelling circuit", and the short-term predictor circuit 25 may be referred to as a "second predictor circuit".

The controller circuit 21 controls charging and discharging of the battery apparatus 13 by setting a charging power or a discharging power per a fourth time interval, based on the long-term predicted power of the customer 1 predicted by the long-term predictor circuit 23. The fourth time interval is, for example, 30 minutes or one hour. The controller circuit 21 further controls discharging of the battery apparatus 13 by setting a discharging power per a fifth time interval shorter than the fourth time interval, based on the short-term predicted power of the customer 1 predicted by the short-term predictor circuit 25. The fifth time interval is, for example, one minute.

Figure 2:
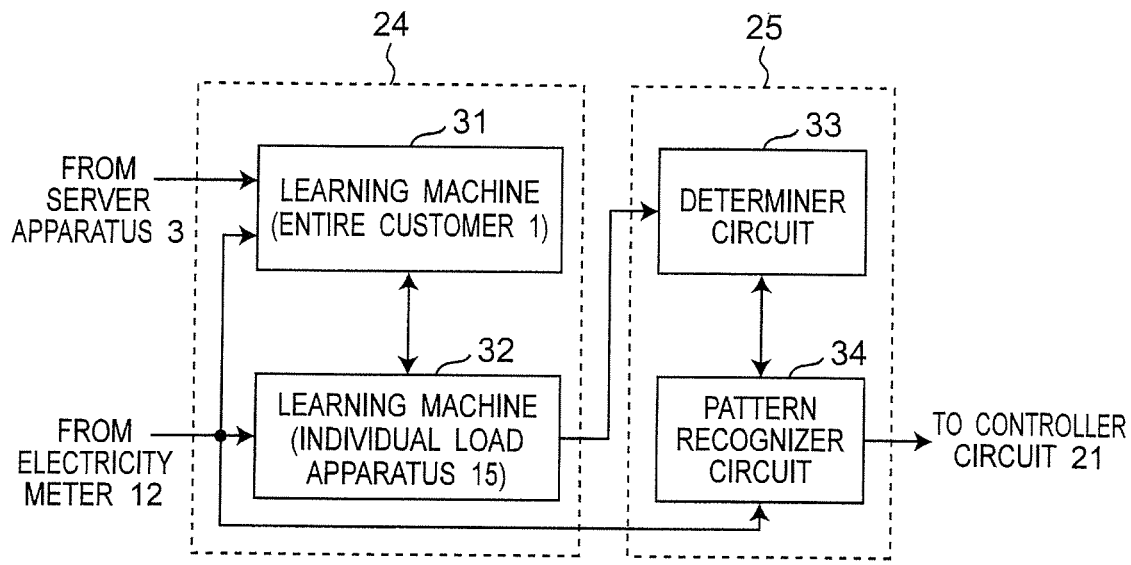
FIG. 2 is a block diagram showing a configuration of a short-term prediction modelling circuit 24 and a short-term predictor circuit 25 of FIG. 1.

FIG. 2 is a block diagram showing a configuration of the short-term prediction modelling circuit 24 and the short-term predictor circuit 25 of FIG. 1.

The short-term prediction modelling circuit 24 is provided with a learning machine 31 and a learning machine 32. The learning machine 31 learns a model of the entire consumed power of the customer 1, based on the temporal variations in the entire consumed power of the customer 1 measured by the electricity meter 12, and the temporal variations in the consumed powers of other customers obtained from the server apparatus 3. The learning machine 32 learns the short-term prediction model of the consumed power of the individual load apparatus 15, based on the temporal variations in the entire consumed power of the customer 1 measured by the electricity meter 12.

The learning machine 31 classifies patterns of temporal variations in consumed powers of various load apparatuses, based on information about temporal variations in consumed powers of various customers, and based on other information (such as information about the load apparatuses of other customers). The learning machine 31 determines whether or not the customer 1 is provided with the same load apparatus as that of other customers, based on the entire consumed power of the customer 1. In the case where the customer 1 is provided with a load apparatus having a known pattern of the temporal variations in the consumed power, it is possible to improve learning efficiency and learning accuracy of the learning machine 32 by considering a determined result of the learning machine 31. The learning machine 31 classifies types of customers, including a house, a shop, a plant, and the like, based on information about the temporal variations in the consumed powers of the various customers, and based on other information. The learning machine 31 determines to which type the customer 1 belongs, based on the entire consumed power of the customer 1. In the case where the customer 1 belongs to a known type, it is possible to reduce burden of detailed learning of the learning machine 32 by considering the determined result of the learning machine 31, thus improving the learning efficiency and the learning accuracy of the learning machine 32. The learning machine 32 learns in detail a pattern of the temporal variations in the consumed power unique to the customer 1, based on the temporal variations in the entire consumed power of the customer 1, and produces the short-term prediction model corresponding to the individual load apparatus 15. In addition, when the learning machine 31 considers a determined result of the learning machine 32, it is possible to improve learning efficiency and learning accuracy of the learning machine 31 for classifying the patterns of the temporal variations in the consumed powers of the various load apparatuses, and for classifying the types of the customers.

The short-term predictor circuit 25 is provided with a determiner circuit 33 and a pattern recognizer circuit 34. The short-term prediction model produced by the learning machine 32 is set into the determiner circuit 33. The determiner circuit 33 determines, under control of the pattern recognizer circuit 34, whether or not the temporal variations in the entire consumed power of the customer 1 measured by the electricity meter 12 match with the short-term prediction model produced by the learning machine 32. In the case where the temporal variations in the entire consumed power of the customer 1 match with a beginning of a short-term prediction model, the pattern recognizer circuit 34 notifies the controller circuit 21, of the temporal variations in the entire consumed power of the customer 1 indicated by a subsequent portion of the same short-term prediction model.

Each of the learning machines 31, 32 and the determiner circuit 33 of FIG. 2 may be provided with a neural network.

Figure 3:
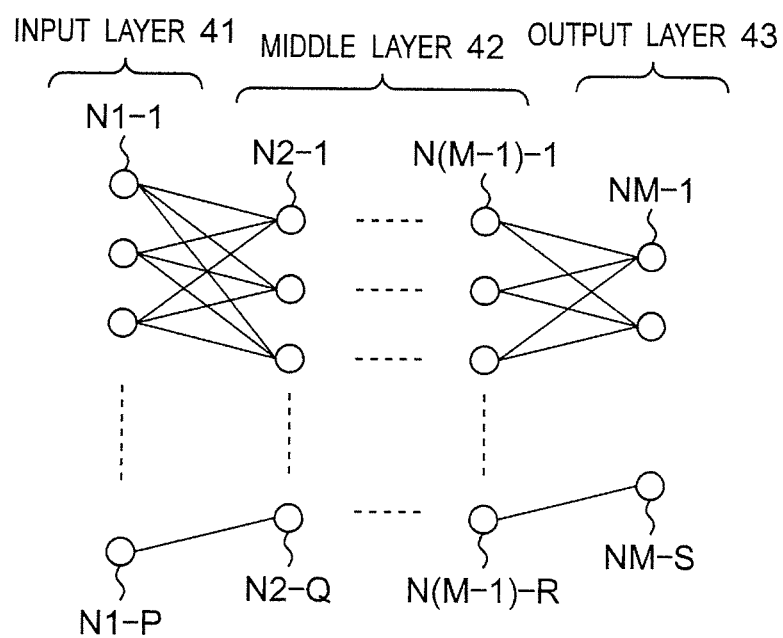
FIG. 3 is a diagram showing an exemplary neural network used by each of learning machines 31, 32 and a determiner circuit 33 of FIG. 2.

FIG. 3 is a diagram showing an exemplary neural network used by each of the learning machines 31, 32 and the determiner circuit 33 of FIG. 2. The neural network is provided with nodes N1-1 to N1-P of an input layer 41, nodes N2-1 to N2-Q, ..., N(M−1)-1 to N(M−1)-R of at least one middle layer 42, and nodes NM-1 to NM-S of an output layer 43. Into the input layer 41 of the neural network of the learning machine 32, time-series data indicating the temporal variations in the entire consumed power of the customer 1 over a time length (second time interval) shorter than a time length of the short-term prediction model to be produced is set. Into the output layer 43 of the neural network of the learning machine 32, time-series data indicating the temporal variations in the entire consumed power of the customer 1 over the time length (first time interval) of the short-term prediction model to be produced is set. The short-term prediction model learned by the learning machine 32, i.e., weight coefficients of the middle layer 42, is set into the middle layer 42 of the neural network of the determiner circuit 33. Into the input layer 41 of the neural network of the determiner circuit 33, time-series data indicating the temporal variations in the entire consumed power of the customer 1 over the same time length (second time interval), as that of the time-series data inputted into the input layer 41 of the neural network of the learning machine 32, is inputted. From the output layer 43 of the neural network of the determiner circuit 33, time-series data indicating the temporal variations in the entire consumed power of the customer 1 over the time length (first time interval) of the short-term prediction model is outputted. In the case where the time-series data inputted into the input layer 41 of the neural network of the determiner circuit 33 matches with a beginning of a short-term prediction model, time-series data indicating the temporal variations in the entire consumed power of the customer 1 indicated by the entire of the same short-term prediction model is outputted from the output layer 43 of the neural network of the determiner circuit 33.

Into the input layers 41 of the neural networks of the learning machine 32 and the determiner circuit 33 of FIG. 2, other data may be further inputted as described below, for example, by the server apparatus 3 or the controller circuit 21.

Into the input layers 41, data indicating the type of the customer 1, such as a house, a shop, a plant, or the like, may be further inputted. Using such data, it is possible to estimate a model and consumed power of each load apparatus 15, a time slot when each load apparatus 15 is operated, and the like, thus improving accuracy of learning and prediction.

Into the input layers 41, data indicating a number of users of the customer 1 or family members of the customer 1 may be further inputted. Using such data, it is possible to estimate a time slot when each load apparatus 15 is operated, and the like, thus improving accuracy of learning and prediction.

Into the input layers 41, data indicating a model or a model number of each load apparatus 15 may be further inputted. Using such data, it is possible to estimate a consumed power of each load apparatus 15, and the like, thus improving accuracy of learning and prediction.

Into the input layers 41, data indicating an ON/OFF status or consumed power of each load apparatus 15 may be further inputted (see second embodiment described later).

Into the input layers 41, data indicating behavior of a user of the customer 1 may be further inputted. Using such data, it is possible to estimate a time slot when each load apparatus 15 is operated, and the like, thus improving accuracy of learning and prediction. For example, in order to obtain the data indicating behavior of a user of the customer 1, the server apparatus 3 may extract data about when, how, and which load apparatus 15 is used by the user, from the user's postings to social network services.

Into the input layers 41, data indicating weather may be further inputted. Using such data, it is possible to estimate, for example, a consumed power and a time slot when the load apparatus 15 as an air conditioner is operated, thus improving accuracy of learning and prediction.

Into the input layers 41, data indicating date and time, or day of the week may be further inputted. Using such data, it is possible to estimate a time slot when each load apparatus 15 is operated, based on information about an event to be held on a particular day of the week, a seasonal event, or the like, thus improving accuracy of learning and prediction.

Figure 4:
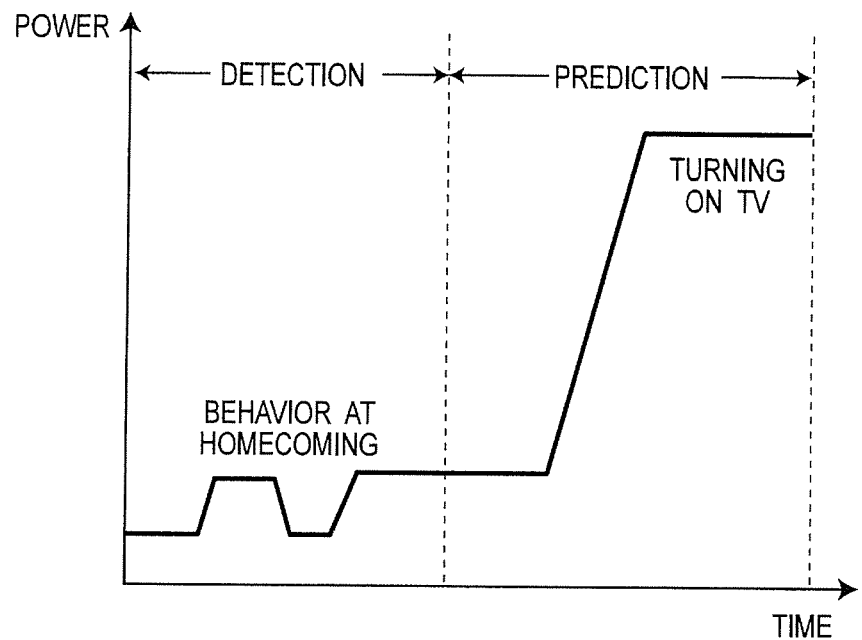
FIG. 4 is a diagram showing a first exemplary short-term prediction model used by the short-term predictor circuit 25 of FIG. 1.
Figure 5:
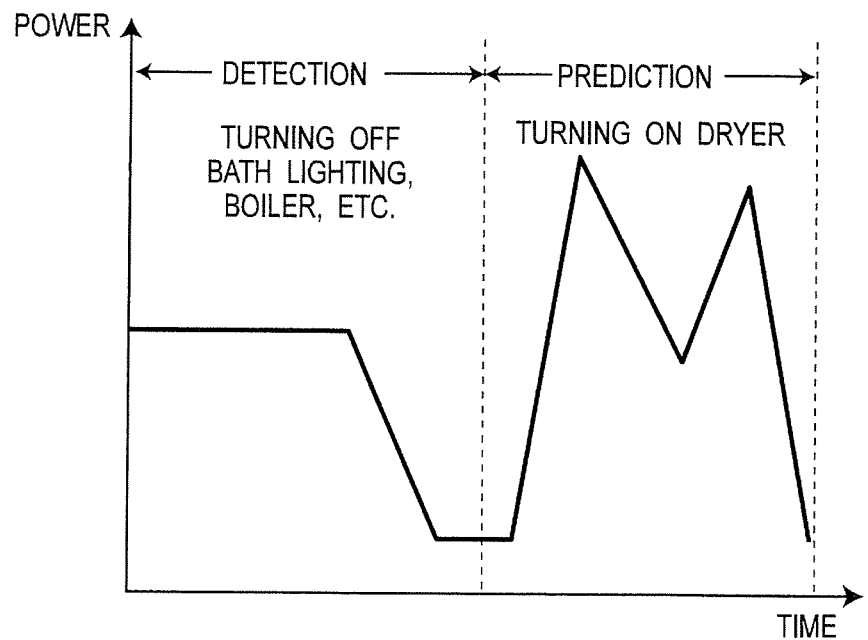
FIG. 5 is a diagram showing a second exemplary short-term prediction model used by the short-term predictor circuit 25 of FIG. 1.
Figure 6:
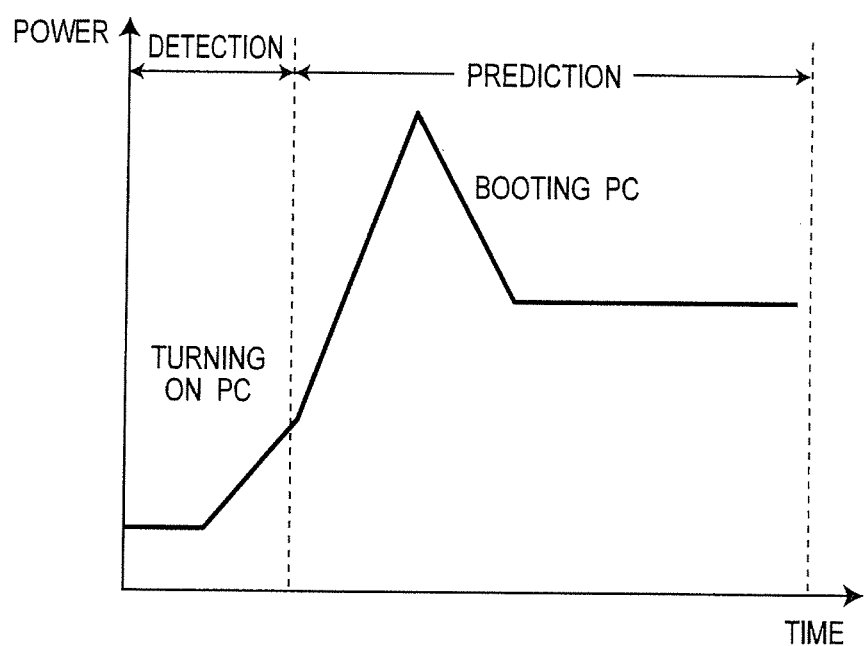
FIG. 6 is a diagram showing a third exemplary short-term prediction model used by the short-term predictor circuit 25 of FIG. 1.

With reference to FIGS. 4 to 6, exemplary short-term prediction models used by the short-term predictor circuit 25 of FIG. 1 will be described.

FIG. 4 is a diagram showing a first exemplary short-term prediction model used by the short-term predictor circuit 25 of FIG. 1. For example, consider a case where, when a user comes home at most weekday nights, the user firstly turns on lighting equipment or the like, and then turns on a television apparatus (TV). By detecting turning on of the lighting equipment or the like, it is possible to predict that the television apparatus would be then turned on. In this case, the controller circuit 21 controls discharging of the battery apparatus 13 by setting a discharging power according to a consumed power of the television apparatus.

FIG. 5 is a diagram showing a second exemplary short-term prediction model used by the short-term predictor circuit 25 of FIG. 1. For example, suppose a case where, often after a user takes a bath, the user turns off a bath lighting and a boiler, and then turns on a hair dryer. By detecting turning off of the bath lighting and the boiler, it is possible to predict that the hair dryer would be then turned on. In this case, the controller circuit 21 controls discharging of the battery apparatus 13 by setting a discharging power according to a consumed power of the hair dryer.

FIG. 6 is a diagram showing a third exemplary short-term prediction model used by the short-term predictor circuit 25 of FIG. 1. For example, suppose a case where, when starting up a personal computer (PC), the PC runs a booting process with a relatively low consumed power immediately after turning on the PC, and then transitions to an active state with a higher consumed power. By detecting the boot process immediately after turning on the PC, it is possible to predict a consumed power thereafter. In this case, the controller circuit 21 controls discharging of the battery apparatus 13 by setting a discharging power according to the predicted consumed power.

Next, with reference to FIGS. 7 to 9, advantageous effects of the electric power management system of the first embodiment will be described.

Figure 7:
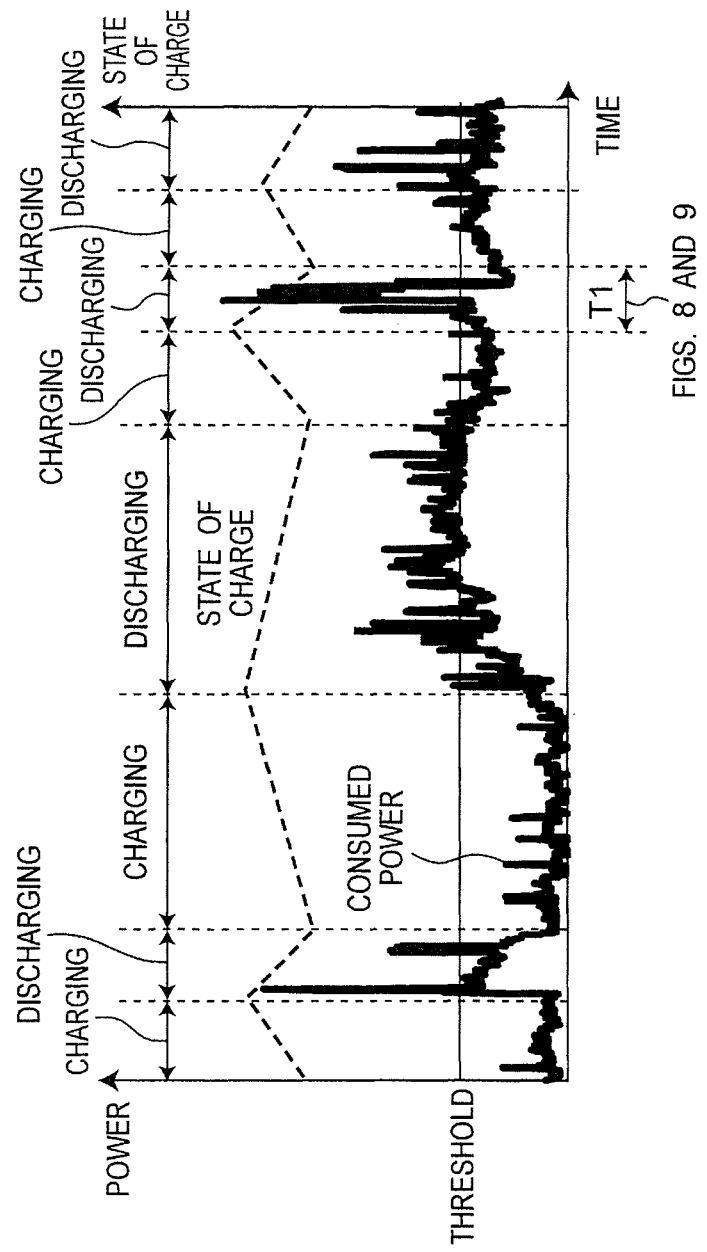
FIG. 7 is a graph showing temporal variations in an entire consumed power of the customer 1 of FIG. 1.

FIG. 7 is a graph showing the temporal variations in the entire consumed power of the customer 1 of FIG. 1. FIG. 7 further shows control of charging and discharging of the battery apparatus 13 based on the long-term prediction model. When the entire consumed power of the customer 1 is predicted to fall below a threshold as shown in FIG. 7, the controller apparatus 16 charges the battery apparatus 13, while supplying power generated by the power generator apparatus 14 and/or power received from the electricity delivery system 2, to the load apparatus 15. When the entire consumed power of the customer 1 is predicted to reach or exceed the threshold as shown in FIG. 7, the controller apparatus 16 supplies power discharged from the battery apparatus 13, to the load apparatus 15, while supplying power generated by the power generator apparatus 14 and/or power received from the electricity delivery system 2, to the load apparatus 15. Before a time interval comes in which the entire consumed power of the customer 1 is predicted to reach or exceed the threshold as shown in FIG. 7, the controller apparatus 16 predicts an amount of electric energy to be discharged, and charges the battery apparatus 13 in advance. In this way, it is possible to optimize an amount of electric energy to be charged and an amount of electric energy to be discharged, using the long-term prediction model.

Figure 8:
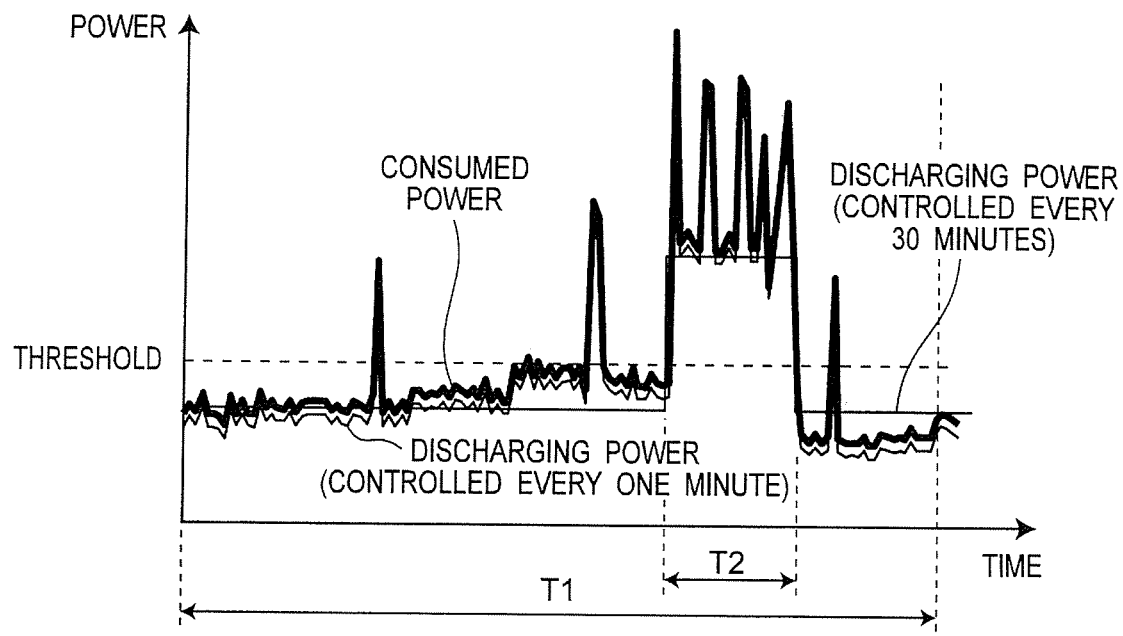
FIG. 8 is a graph showing temporal variations in an entire consumed power of the customer 1 of FIG. 1, and in discharging power of its battery apparatus 13.
Figure 9:
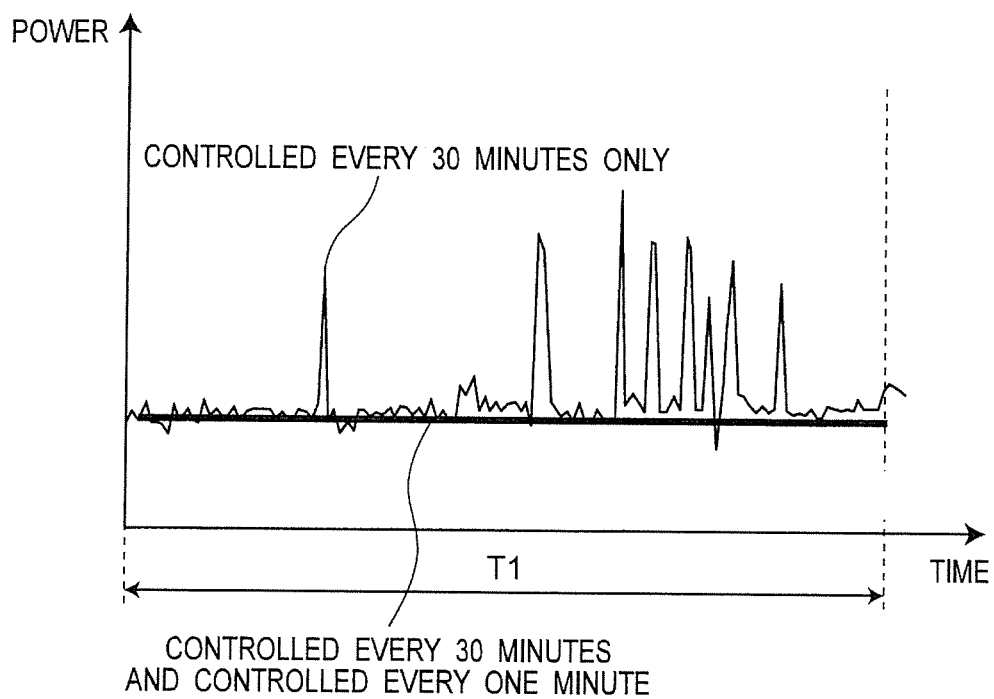
FIG. 9 is a graph showing temporal variations in power received by the customer 1 of FIG. 1 from an electricity delivery system 2.

FIG. 8 is a graph showing temporal variations in the entire consumed power of the customer 1 of FIG. 1, and in discharging power of its battery apparatus 13. FIG. 9 is a graph showing temporal variations in power received by the customer 1 of FIG. 1 from the electricity delivery system 2. The power received by the customer 1 from the electricity delivery system 2 is the remainder after subtracting the discharging power of the battery apparatus 13 and the generated power of the power generator apparatus 14, from the entire consumed power of the customer 1. FIGS. 8 and 9 correspond to a time section T1 of FIG. 7. The controller apparatus 16 controls charging and discharging of the battery apparatus 13 based on the long-term prediction model, for example, so as to achieve balancing every 30 minutes (as shown by "controlled every 30 minutes" in FIGS. 8 and 9). Accordingly, for example, in a time section T2 of FIG. 8, the discharging power is increased in accordance with a temporary increase in the consumed power. In the case of using the control every 30 minutes only, the magnitude of the discharging power can not follow the temporal variations in the consumed power, in a time interval shorter than 30 minutes. In this case, as seen from the side of the electricity delivery system 2, a large and rapid change in the entire consumed power of the customer 1 affects the electricity delivery system 2, as shown in FIG. 9, and degrades quality of power transmitted through the electricity delivery system 2. On the other hand, in the case of controlling charging and discharging of the battery apparatus 13 based on the short-term prediction model (as shown by "controlled every one minute" in FIGS. 8 and 9), in addition to the long-term prediction model, it is possible to control the magnitude of the discharging power so as to follow a large and rapid change in the entire consumed power of the customer 1. Accordingly, in this case, the electricity delivery system 2 is less affected by a large and rapid change in the entire consumed power of the customer 1, as shown in FIG. 9, thus stabilizing power of the electricity delivery system 2.

According to the electric power management system of the first embodiment, it is possible to determine the magnitudes of the charging power and the discharging power of the battery apparatus 13 so as to reduce a large and rapid change in the power received from the electricity delivery system 2.

According to the electric power management system of the first embodiment, it is possible to effectively reduce the peak consumed power using both the long-term prediction model and the short-term prediction model. Using the long-term prediction model, it is possible to predict an amount of electric energy required to reduce the peak consumed power, and charge the battery apparatus 13 with the required electric energy in a planned manner. Therefore, it is possible to prevent unnecessary charging (redundant power) and excessive discharging (insufficient power). In addition, using the short-term prediction model, it is possible to predict a large and rapid change in the consumed power, and control discharging rapidly enough to follow such a change. Therefore, it is possible to reduce the peak consumed power with high accuracy.

According to the electric power management system of the first embodiment, using the short-term prediction model, it is possible to discharge the battery apparatus 13 so as to follow a change in the consumed power, and therefore, reduce an amount of electric energy received from the electricity delivery system 2, thus reducing the electricity costs.

According to the electric power management system of the first embodiment, it is possible to reduce a large and rapid change in the power received by the customer 1 from the electricity delivery system 2, and therefore, avoid the necessity for complicated processes, such as demand response of the electricity delivery system 2.

According to the electric power management system of the first embodiment, it is possible to effectively use power generated by the power generator apparatus 14 and charged in the battery apparatus 13, and therefore, more effectively achieve local production and local consumption of power at the customer 1.

In order to control discharging of the battery apparatus 13 so as to follow a large and rapid change in the consumed power, it is necessary to perform short-term prediction and control following short-term variations in the consumed power, and on the other hand, in order to obtain an amount of charged electric energy necessary to reduce a peak, it is necessary to perform prediction and control over a long term, such as one day. If the short-term prediction and control are performed at the same prediction cycle and the same control cycle as those of the long-term prediction and control, a large amount of data is required. However, according to the electric power management system of the first embodiment, it is possible to reduce an increase in the required amount of data by selectively using the long-term prediction model or the short-term prediction model according to a purpose.

Next, modified embodiments of the electric power management system of the first embodiment will be described.

The short-term prediction model may be updated more frequently than the long-term prediction model. In this way, it is possible to more suitably follow a change in an environment of the customer 1, such as change of residents, and improve a learning accuracy of the short-term prediction model.

When setting the discharging power based on the short-term predicted power predicted by the short-term predictor circuit 25, the controller circuit 21 may set an upper limit to the discharging power based on the long-term predicted power predicted by the long-term predictor circuit 23. Even in a case where an amount of charged electric energy is not sufficient to completely offset an increase in the consumed power over an entire time interval when the load apparatus 15 is turned on, the battery apparatus 13 is discharged to even slightly reduce the peak power over the entire of this time interval. In other words, a future charge and discharge plan serves as a restriction on an amount of currently charged electric energy, and thus, it is possible to optimally control charging and discharging of the battery apparatus 13, while considering immediate and future conditions.

The controller circuit 21 may communicate with the external server apparatus 3 to obtain data about the electricity rate from the server apparatus 3. In this case, when the electricity rate exceeds a first threshold, the controller circuit 21 prioritizes the battery apparatus 13 over the electricity delivery system 2 in order to supply power to the load apparatus 15, and therefore, discharges the battery apparatus 13 at a certain discharging power. In addition, when the electricity rate is below a second threshold, the controller circuit 21 charges the battery apparatus 13 at a certain charging power. The second threshold may be higher or lower than the first threshold. Thus, it is possible to reduce the electricity costs.

The customer 1 may omit the power generator apparatus 14, and receive power only from the electricity delivery system 2. Alternatively, the customer 1 may not be connected to the electricity delivery system 2, and may receive power only from the power generator apparatus 14.

At least one of the load apparatus 15 and the battery apparatus 13 may be an electric vehicle.

The customer 1 may be provided with a plurality of battery apparatuses. In this way, it is possible to reduce a charging capacity of each battery apparatus, and increase a maximum current to be controlled.

The short-term prediction modelling circuit 24 may be provided with three or more learning machines.

For example, in the case of transmitting and receiving power among a plurality of customers as will be described in a sixth embodiment, a customer may consider consumed powers of other customers, and produce the long-term prediction model by considering how much power is to be transmitted and received between which customers. In addition, in the case of producing the long-term prediction model using the same method as for the short-term prediction model, the types of customers, including a house, a shop, a plant, and the like, may be classified based on information about temporal variations in consumed power of various customers, and based on other information, in a manner similar to that of the short-term prediction model. The long-term prediction modelling circuit 22 determines to which type the customer 1 belongs, based on the entire consumed power of the customer 1, and produces the long-term prediction model based on the determined result. In this way, it is possible to improve the learning efficiency and the learning accuracy using data about other customers, also when producing the long-term prediction model.

Second Embodiment

Figure 10:
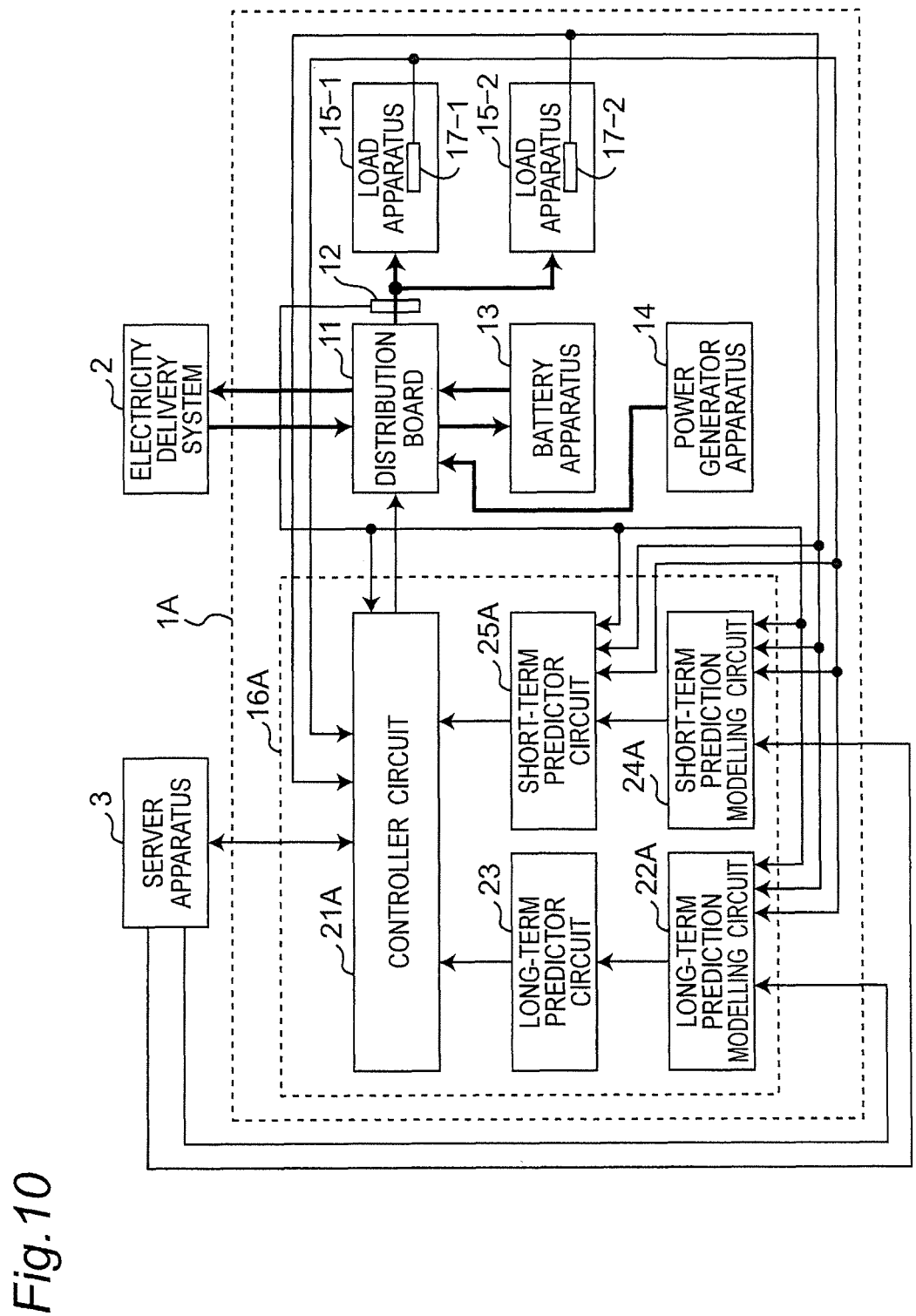
FIG. 10 is a block diagram showing a configuration of an electric power management system of a customer 1A according to a second embodiment.

FIG. 10 is a block diagram showing a configuration of an electric power management system of a customer 1A according to a second embodiment. The customer 1A of FIG. 10 is provided with a controller apparatus 16A, instead of the controller apparatus 16 of the customer 1 of FIG. 1, and further provided with electricity meters 17-1, 17-2.

The electricity meters 17-1, 17-2 measure consumed powers of the load apparatuses 15-1, 15-2, respectively, and notify the controller apparatus 16A of the consumed powers.

The controller apparatus 16A of FIG. 10 is provided with a long-term prediction modelling circuit 22A, a short-term prediction modelling circuit 24A, and a short-term predictor circuit 25A, instead of the long-term prediction modelling circuit 22, the short-term prediction modelling circuit 24, and the short-term predictor circuit 25 of the controller apparatus 16 of FIG. 1. When producing a long-term prediction model, the long-term prediction modelling circuit 22A uses temporal variations in the consumed powers of the load apparatuses 15-1, 15-2 measured by the electricity meters 17-1, 17-2, respectively, in addition to temporal variations in entire consumed power of the customer 1A measured by an electricity meter 12. When producing a short-term prediction model, the short-term prediction modelling circuit 24A uses the temporal variations in the consumed powers of the load apparatuses 15-1, 15-2 measured by the electricity meters 17-1, 17-2, respectively, in addition to the temporal variations in the entire consumed power of the customer 1A measured by the electricity meter 12. The short-term predictor circuit 25A uses the temporal variations in the consumed powers of the load apparatuses 15-1, 15-2 measured by the electricity meters 17-1, 17-2, respectively, in addition to the temporal variations in the entire consumed power of the customer 1A measured by the electricity meter 12.

According to the electric power management system of the second embodiment, it is possible to improve the accuracy of prediction of temporal variations in the entire consumed power of the customer 1A, using the temporal variations in the consumed powers of the load apparatuses 15-1, 15-2 measured by the electricity meters 17-1, 17-2, respectively.

Third Embodiment

Figure 11:
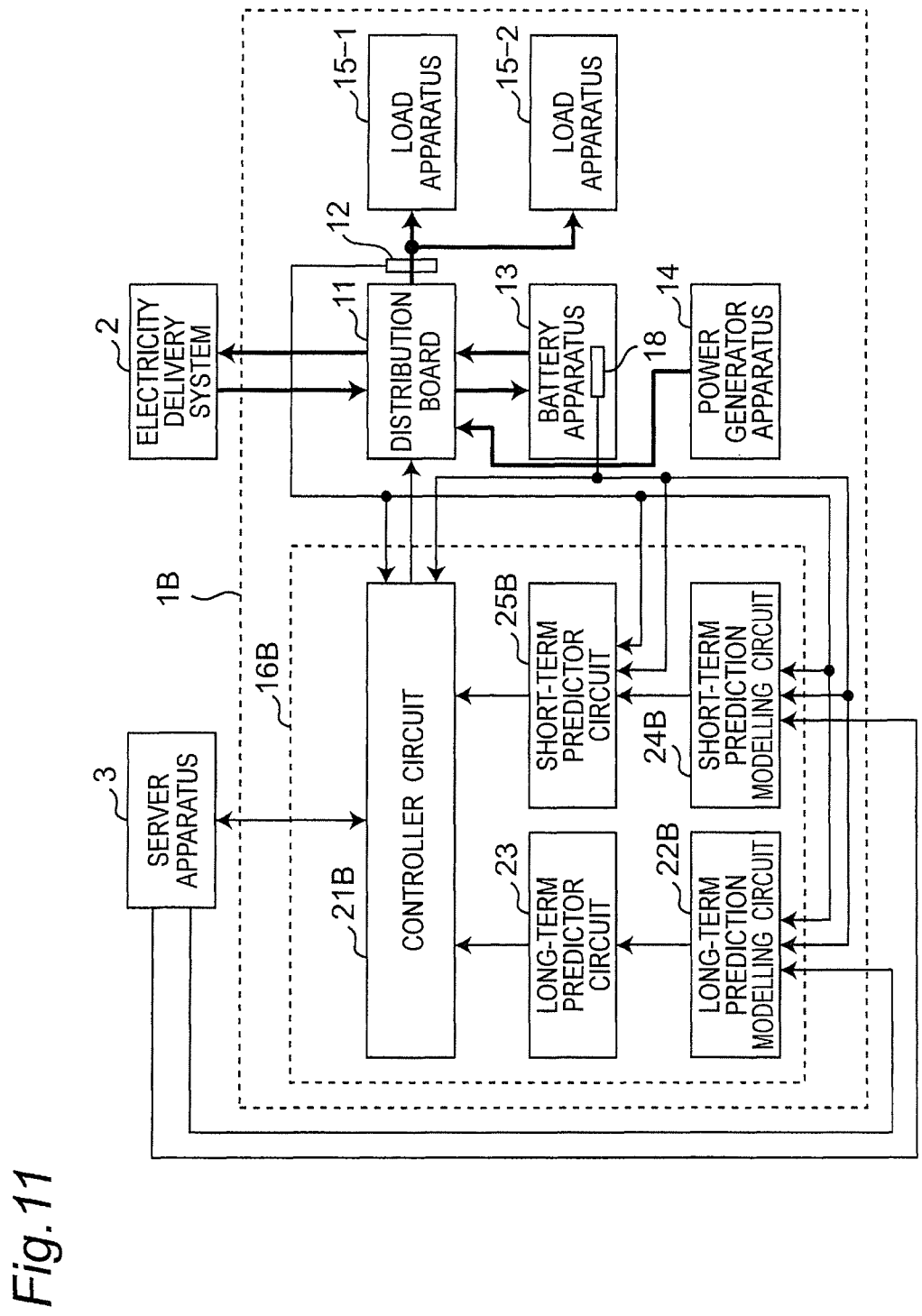
FIG. 11 is a block diagram showing a configuration of an electric power management system of a customer 1B according to a third embodiment.

FIG. 11 is a block diagram showing a configuration of an electric power management system of a customer 1B according to a third embodiment. The customer 1B of FIG. 11 is provided with a controller apparatus 16B, instead of the controller apparatus 16 of the customer 1 of FIG. 1, and further provided with a sensor 18.

The sensor 18 monitors a status of an battery apparatus 13, such as an amount of maximum storable electric energy, an amount of currently stored electric energy (state of charge), degradation, and the like. The sensor 18 notifies the controller apparatus 16B of the status of the battery apparatus 13.

The controller apparatus 16B of FIG. 11 is provided with a controller circuit 21B, a long-term prediction modelling circuit 22B, a short-term prediction modelling circuit 24B, and a short-term predictor circuit 25B, instead of the controller circuit 21, the long-term prediction modelling circuit 22, the short-term prediction modelling circuit 24, and the short-term predictor circuit 25 of the controller apparatus 16 of FIG. 1. When producing a long-term prediction model, the long-term prediction modelling circuit 22B further uses the status of the battery apparatus 13 obtained from the sensor 18. When producing a short-term prediction model, the short-term prediction modelling circuit 24B further uses the status of the battery apparatus 13 obtained from the sensor 18. The short-term predictor circuit 25B further uses the status of the battery apparatus 13 obtained from the sensor 18.

The controller circuit 21B may also further use the status of the battery apparatus 13 obtained from the sensor 18, when controlling charging and discharging of the battery apparatus 13.

According to the electric power management system of the third embodiment, it is possible to more accurately know a magnitude of discharging power and an amount of electric energy to be discharged, using the status of the battery apparatus 13 obtained from the sensor 18.

Fourth Embodiment

Figure 12:
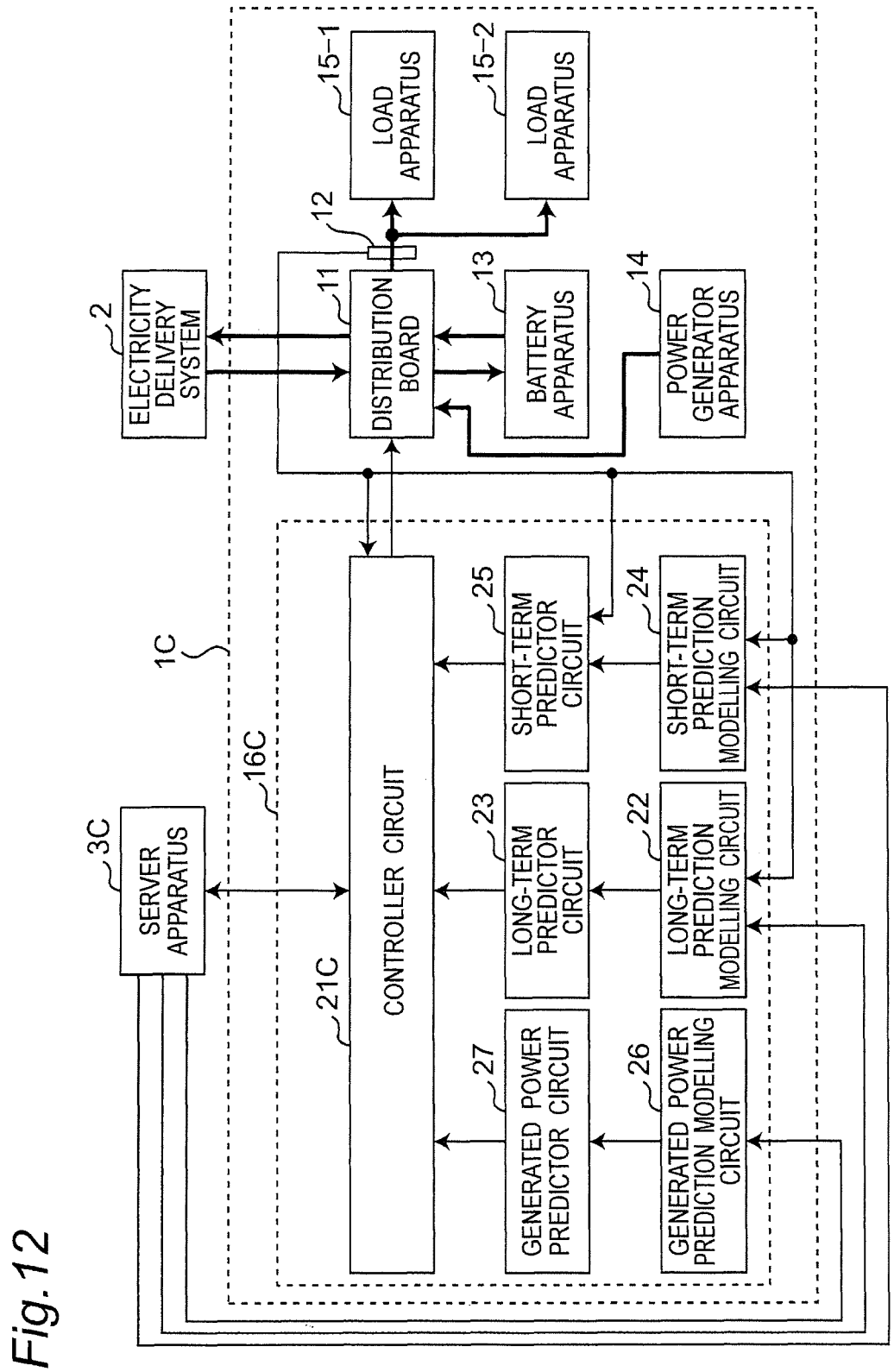
FIG. 12 is a block diagram showing a configuration of an electric power management system of a customer 1C according to a fourth embodiment.

FIG. 12 is a block diagram showing a configuration of an electric power management system of a customer 1C according to a fourth embodiment. The customer 1C of FIG. 12 is provided with a controller apparatus 16C, instead of the controller apparatus 16 of the customer 1 of FIG. 1.

In the case where a power generator apparatus 14 is provided with solar cells, the controller apparatus 16C may predict temporal variations in generated power of the solar cells. The controller apparatus 16C of FIG. 12 is provided with a controller circuit 21C, instead of the controller circuit 21 of FIG. 1, and further provided with a generated power prediction modelling circuit 26 and a generated power predictor circuit 27. The generated power prediction modelling circuit 26 communicates with an external server apparatus 3C to obtain weather data from the server apparatus 3C, and produces a generated power prediction model based on the weather data. The generated power predictor circuit 27 predicts the temporal variations in the generated power of the solar cells based on the generated power prediction model.

According to the electric power management system of the fourth embodiment, it is possible to more accurately control charging and discharging of an battery apparatus 13, by predicting the generated power of the power generator apparatus 14.

Fifth Embodiment

Figure 13:
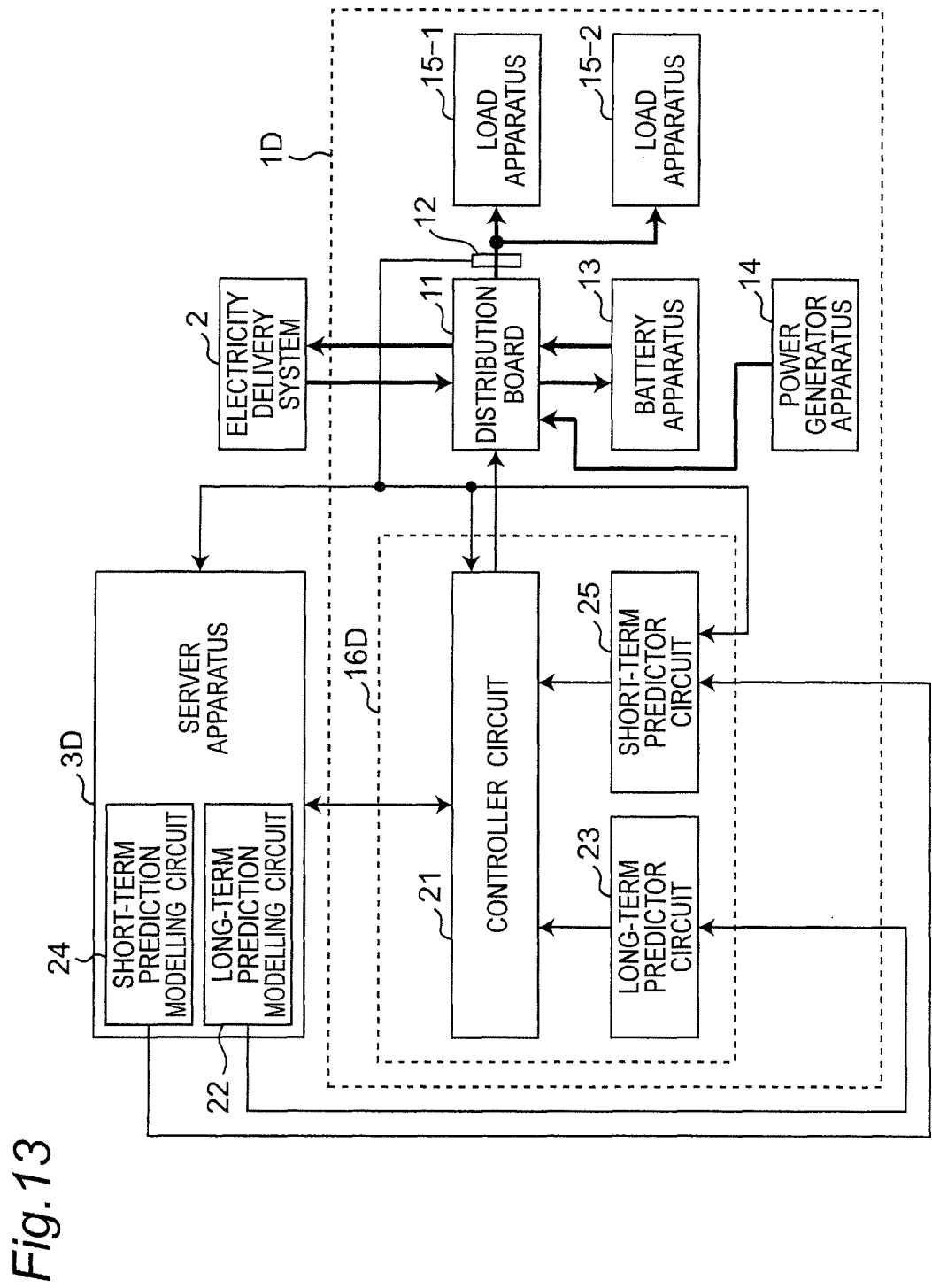
FIG. 13 is a block diagram showing a configuration of an electric power management system of a customer 1D according to a fifth embodiment.

FIG. 13 is a block diagram showing a configuration of an electric power management system of a customer 1D according to a fifth embodiment. The customer 1D of FIG. 13 is provided with a controller apparatus 16D, instead of the controller apparatus 16 of the customer 1 of FIG. 1.

The controller apparatus 16D of FIG. 13 omits the long-term prediction modelling circuit 22 and the short-term prediction modelling circuit 24 of the controller apparatus 16 of FIG. 1. The long-term prediction modelling circuit 22 and the short-term prediction modelling circuit 24 are provided in an external server apparatus 3D. The controller apparatus 16D communicates with an external server apparatus 3D to obtain a long-term prediction model and a short-term prediction model from the server apparatus 3D.

According to the electric power management system of the fifth embodiment, it is possible to simplify a configuration and processes of the controller apparatus 16D, by producing the long-term prediction model and the short-term prediction model by the server apparatus 3D. By extending the server apparatus 3D, it is possible to easily handle an increased amount of data for producing the long-term prediction model and the short-term prediction model.

On the other hand, in the case where the controller apparatus 16 of the customer 1 produces the long-term prediction model and the short-term prediction model, as in the case of the electric power management system of the first embodiment or other embodiments, the controller apparatus 16 can operate autonomously, and continue to operate even when the server apparatus 3 goes down. In addition, it is possible to reduce costs for communication with the server apparatus 3. In the case where the short-term prediction modelling circuit 24 and the short-term predictor circuit 25 are provided in the customer 1, it is possible to rapidly follow a change in the short-term prediction model.

A long-term predictor circuit 23 and a short-term predictor circuit 25 of the controller apparatus 16D may also be provided in the server apparatus 3D. In this way, it is possible to further simplify the configuration and processes of the controller apparatus 16D.

Sixth Embodiment

Figure 14:
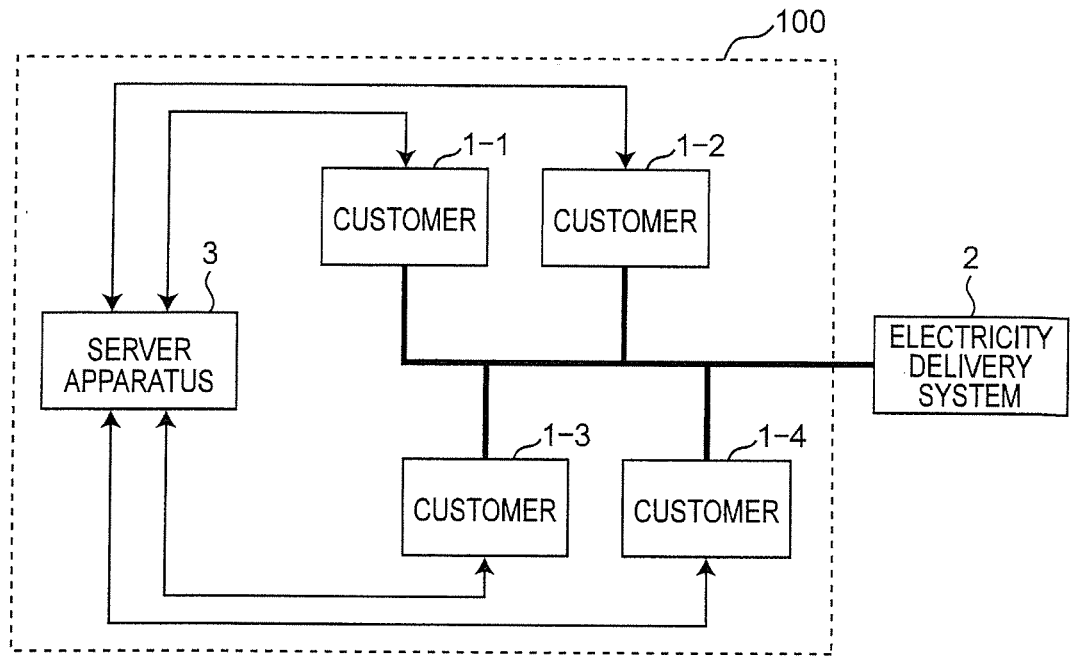
FIG. 14 is a block diagram showing a configuration of a power grid 100 according to a sixth embodiment.

FIG. 14 is a block diagram showing a configuration of a power grid 100 according to a sixth embodiment. The power grid 100 of FIG. 14 includes a plurality of customers 1-1 to 1-4 connected to an electricity delivery system 2, and a server apparatus 3. Each of the plurality of customers 1-1 to 1-4 is configured in a manner similar to that of the customer 1 of the first embodiment or other embodiments. The server apparatus 3 controls controller apparatuses 16 of the customers 1-1 to 1-4 to control transmitting and receiving of power among the customers 1-1 to 1-4. In sixth and seventh embodiments, the server apparatus 3 of the power grid 100 may be referred to as a "first server apparatus". In addition, the sixth embodiment may be referred to as a "electric power management system of the power grid" or a "power grid management system".

The server apparatus 3 produces a long-term prediction model of the power grid 100 indicating temporal variations in an entire consumed power of the power grid 100 for each moment of clock times, based on long-term prediction models of the customers 1-1 to 1-4. The server apparatus 3 predicts a long-term predicted power of the power grid 100 using the long-term prediction model of the power grid 100, the long-term predicted power indicating the temporal variations in the entire consumed power of the power grid 100. In the specification, the long-term prediction model of the power grid 100 may be referred to as a "third prediction model", and the long-term predicted power of the power grid 100 may be referred to as a "third predicted power".

The server apparatus 3 produces a short-term prediction model of the power grid 100 indicating the temporal variations in the entire consumed power of the power grid 100 over a sixth time interval in which consumed powers of the customers 1-1 to 1-4 change, based on the long-term prediction models and short-term prediction models of the customers 1-1 to 1-4. The server apparatus 3 predicts a short-term predicted power using the short-term prediction model, based on the temporal variations in the entire consumed power of the power grid 100 over a seventh time interval immediately before a current time, the short-term predicted power indicating the temporal variations in the entire consumed power of the power grid 100 over an eighth time interval immediately after the current time. In the specification, the short-term prediction model of the power grid 100 may be referred to as a "fourth prediction model", and the short-term predicted power of the power grid 100 may be referred to as a "fourth predicted power".

The server apparatus 3 controls transmitting and receiving of power among the customers 1-1 to 1-4 by setting transmitting powers and receiving powers per a ninth time interval based on the long-term predicted power. The server apparatus 3 controls transmitting and receiving of power among the customers 1-1 to 1-4 by setting transmitting powers and receiving powers per a tenth time interval shorter than the ninth time interval based on the short-term predicted power.

According to the power grid management system of the sixth embodiment, it is possible to predict the temporal variations in the entire consumed power of the power grid, and stably control the entire power grid.

Seventh Embodiment

Figure 15:
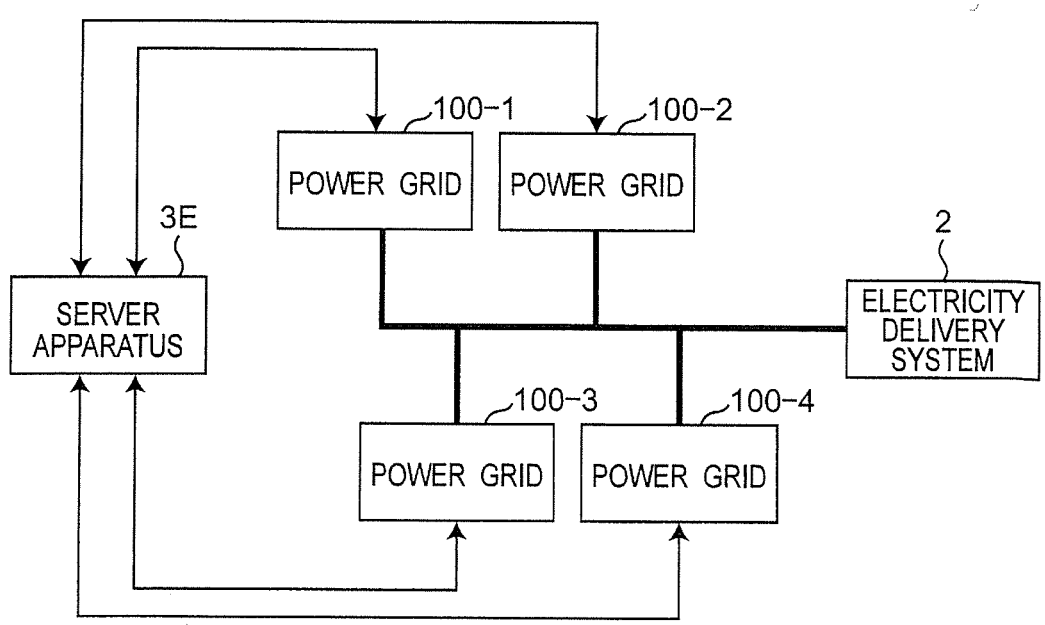
FIG. 15 is a block diagram showing a configuration of a power network according to a seventh embodiment.

FIG. 15 is a block diagram showing a configuration of a power network according to a seventh embodiment. The power network of FIG. 15 includes a plurality of power grids 100-1 to 100-4 connected to an electricity delivery system 2, and a server apparatus 3E. Each of the plurality of power grids 100-1 to 100-4 is configured in a manner similar to that of the power grid 100 of the sixth embodiment. The server apparatus 3E controls transmitting and receiving of power among the power grids 100-1 to 100-4 by controlling first server apparatuses 3 of the power grids 100-1 to 100-4. In the seventh embodiment, the server apparatus 3E of the power network may be referred to as a "second server apparatus". In addition, the seventh embodiment may be referred to as a "electric power management system of the power network" or a "power network management system".

The server apparatus 3E produces a long-term prediction model of the power network indicating temporal variations in an entire consumed power of the power network for each moment of clock times, based on long-term prediction models of the power grids 100-1 to 100-4. The server apparatus 3E predicts a long-term predicted power of the power network using the long-term prediction model of the power network, the long-term predicted power indicating the temporal variations in the entire consumed power of the power network. In the specification, the long-term prediction model of the power network may be referred to as a "fifth prediction model", and the long-term predicted power of the power network may be referred to as a "fifth predicted power".

The server apparatus 3E produces a short-term prediction model of the power network indicating the temporal variations in the entire consumed power of the power network over an eleventh time interval in which consumed powers of the power grids 100-1 to 100-4 change, based on the long-term prediction models and short-term prediction models of the power grids 100-1 to 100-4. The server apparatus 3E predicts a short-term predicted power of the power network using the short-term prediction model of the power network, based on the temporal variations in the entire consumed power of the power network over a twelfth time interval immediately before a current time, the short-term predicted power indicating the temporal variations in the entire consumed power of the power network over a thirteenth time interval immediately after the current time. In the specification, the short-term prediction model of the power network may be referred to as a "sixth prediction model", and the short-term predicted power of the power network may be referred to as a "sixth predicted power".

The server apparatus 3E controls transmitting and receiving of power among the power grids 100-1 to 100-4 by setting transmitting powers and receiving powers per a fourteenth time interval based on the long-term predicted power of the power network. The server apparatus 3E controls transmitting and receiving of power among the power grids 100-1 to 100-4 by setting transmitting powers and receiving powers per a fifteenth time interval shorter than the fourteenth time interval based on the short-term predicted power of the power network.

According to the power network management system of the seventh embodiment, it is possible to predict temporal variations in the entire consumed power of the power network, and stably control the entire power network.

In addition, a further higher-level electric power management system may be configured, including a plurality of power networks, each configured in a manner similar to that of the power network of the seventh embodiment.

Charging and discharging of battery apparatuses of a lower-level electric power management system may be restricted by a higher-level electric power management system. For example, at a power grid, transmitting and receiving of power among customers are restricted so as to achieve a supply/demand balance of the entire power grid, and a customer at a lower level controls charging and discharging of the battery apparatus by considering such a restriction.

The controller apparatus for the battery apparatus, the electric power management system, the power grid management system, and the power network management system of the present disclosure are configured as described below.

According to the first aspect of a controller apparatus for an battery apparatus, a controller apparatus for an battery apparatus of a customer is provided, the customer being connected to an electricity delivery system and provided with a plurality of load apparatuses and at least one battery apparatus. The controller apparatus is provided with: a first predictor circuit, a second predictor circuit, and a controller circuit. The first predictor circuit predicts a first predicted power using a first prediction model, the first prediction model indicating temporal variations in an entire consumed power of the customer for each moment of clock times, and the first predicted power indicating the temporal variations in the entire consumed power of the customer. The second predictor circuit predicts a second predicted power using a second prediction model, the second prediction model indicating the temporal variations in the entire consumed power of the customer over a first time interval before and after a change in a consumed power of each of the plurality of load apparatuses, the second predicted power being predicted based on the temporal variations in the entire consumed power of the customer over a second time interval immediately before a current time, and the second predicted power indicating the temporal variations in the entire consumed power of the customer over a third time interval immediately after the current time. The controller circuit controls charging and discharging of the battery apparatus by setting a charging power or a discharging power per a fourth time interval based on the first predicted power, and controls discharging of the battery apparatus by setting a discharging power per a fifth time interval shorter than the fourth time interval based on the second predicted power.

According to the second aspect of the controller apparatus for the battery apparatus, in the first aspect of the controller apparatus for the battery apparatus, the second predictor circuit is provided with a neural network having an input layer to which time-series data indicating the temporal variations in the entire consumed power of the customer over the second time interval is inputted, at least one middle layer, and an output layer from which time-series data indicating the temporal variations in the entire consumed power of the customer over the first time interval is outputted. The neural network is trained so as to exhibit the second prediction model.

According to the third aspect of the controller apparatus for the battery apparatus, in the second aspect of the controller apparatus for the battery apparatus, data indicating a type of the customer, including a house, a shop, and a plant, is further inputted to the input layer.

According to the fourth aspect of the controller apparatus for the battery apparatus, in the second or third aspect of the controller apparatus for the battery apparatus, data indicating a number of users of the customer or family members of the customer is further inputted to the input layer.

According to the fifth aspect of the controller apparatus for the battery apparatus, in one of the second to fourth aspects of the controller apparatus for the battery apparatus, data indicating models or model numbers of the load apparatuses is further inputted to the input layer.

According to the sixth aspect of the controller apparatus for the battery apparatus, in one of the second to fifth aspects of the controller apparatus for the battery apparatus, data indicating ON/OFF statuses or consumed powers of the load apparatuses is further inputted to the input layer.

According to the seventh aspect of the controller apparatus for the battery apparatus, in one of the second to sixth aspects of the controller apparatus for the battery apparatus, data indicating a status of the battery apparatus is further inputted to the input layer.

According to the eighth aspect of the controller apparatus for the battery apparatus, in one of the second to seventh aspects of the controller apparatus for the battery apparatus, data indicating behavior of a user of the customer is further inputted to the input layer.

According to the ninth aspect of the controller apparatus for the battery apparatus, in one of the second to eighth aspects of the controller apparatus for the battery apparatus, data indicating weather is further inputted to the input layer.

According to the tenth aspect of the controller apparatus for the battery apparatus, in one of the second to ninth aspects of the controller apparatus for the battery apparatus, data indicating date and time, or day of a week is further inputted to the input layer.

According to the 11th aspect of the controller apparatus for the battery apparatus, in one of the first to tenth aspects of the controller apparatus for the battery apparatus, the second prediction model indicates the temporal variations in the entire consumed power of the customer over the first time interval before and after turning on each of the plurality of load apparatuses.

According to the 12th aspect of the controller apparatus for the battery apparatus, the first to 11th aspects of the controller apparatus for the battery apparatus is further provided with: a first prediction modelling circuit that produces the first prediction model; and a second prediction modelling circuit that produces the second prediction model.

According to the 13th aspect of the controller apparatus for the battery apparatus, in one of the first to 11th aspects of the controller apparatus for the battery apparatus, the controller apparatus communicates with an external server apparatus to obtain the first prediction model and the second prediction model from the server apparatus.

According to the 14th aspect of the controller apparatus for the battery apparatus, in the 12th or 13th aspect of the controller apparatus for the battery apparatus, the first prediction model and the second prediction model are produced based on consumed powers of other customers.

According to the 15th aspect of the controller apparatus for the battery apparatus, in one of the 12th to 14th aspects of the controller apparatus for the battery apparatus, the second prediction model is more frequently updated than the first prediction model.

According to the 16th aspect of the controller apparatus for the battery apparatus, in one of the first to 15th aspects of the controller apparatus for the battery apparatus, the controller circuit sets an upper limit to the discharging power based on the first predicted power, when setting the discharging power based on the second predicted power.

According to the 17th aspect of the controller apparatus for the battery apparatus, in one of the first to 16th aspects of the controller apparatus for the battery apparatus, the controller circuit communicates with an external server apparatus to obtain data about an electricity rate from the server apparatus, discharges the battery apparatus at a discharging power, when the electricity rate exceeds a first threshold, and charges the battery apparatus at a charging power, when the electricity rate falls below a second threshold.

According to the 18th aspect of the controller apparatus for the battery apparatus, in one of the first to 17th aspects of the controller apparatus for the battery apparatus, the customer is provided with a power generator apparatus.

According to the 19th aspect of the controller apparatus for the battery apparatus, in the 18th aspect of the controller apparatus for the battery apparatus, the power generator apparatus is provided with solar cells. The controller apparatus is provided with a third predictor circuit that communicates with an external server apparatus to obtain weather data from the server apparatus, and predicts temporal variations in a generated power of the solar cells based on the weather data.

According to the 20th aspect of the controller apparatus for the battery apparatus, in one of the first to 19th aspects of the controller apparatus for the battery apparatus, the load apparatuses includes an electric vehicle.

According to the 21st aspect of an electric power management system, an electric power management system for a customer connected to an electricity delivery system is provided. The customer is provided with: a plurality of load apparatuses, at least one battery apparatus, and a controller apparatus according to one of the first to 20th aspects of the controller apparatus for the battery apparatus.

According to the 22nd aspect of a power grid management system, a power grid management system for a power grid including a plurality of customers connected to an electricity delivery system is provided. Each of the plurality of customers is provided with the 21st aspect of the electric power management system. The power grid further includes a first server apparatus that controls transmitting and receiving of power among the customers by controlling controller apparatuses of the customers.

According to the 23rd aspect of the power grid management system, in the 22rd aspect of the power grid management system, the first server apparatus produces a third prediction model indicating temporal variations in an entire consumed power of the power grid for each moment of clock times, based on first prediction models of the customers. The first server apparatus predicts a third predicted power using the third prediction model, the third predicted power indicating the temporal variations in the entire consumed power of the power grid. The first server apparatus produces a fourth prediction model indicating the temporal variations in the entire consumed power of the power grid over a sixth time interval in which consumed powers of the customers change, based on the first prediction models and second prediction models of the customers. The first server apparatus predicts a fourth predicted power using the fourth prediction model, based on the temporal variations in the entire consumed power of the power grid over a seventh time interval immediately before a current time, the fourth predicted power indicating the temporal variations in the entire consumed power of the power grid over an eighth time interval immediately after the current time. The first server apparatus controls transmitting and receiving of power among the customers by setting transmitting powers and receiving powers per a ninth time interval based on the third predicted power. The first server apparatus controls transmitting and receiving of power among the customers by setting transmitting powers and receiving powers per a tenth time interval shorter than the ninth time interval based on the fourth predicted power.

According to the 24th aspect of a power network management system, a power network management system for a power network including a plurality of power grids connected to an electricity delivery system is provided. Each of the plurality of power grids is provided with the 23rd aspect of the power grid management system. The power network further includes a second server apparatus that controls transmitting and receiving of power among the power grids by controlling first server apparatuses of the power grids.

According to the 25th aspect of the power network management system, in the 24th aspect of the power network management system, the second server apparatus produces a fifth prediction model indicating temporal variations in an entire consumed power of the power network for each moment of clock times, based on third prediction models of the power grids. The second server apparatus predicts a fifth predicted power using the fifth prediction model, the fifth predicted power indicating the temporal variations in the entire consumed power of the power network. The second server apparatus produces a sixth prediction model indicating the temporal variations in the entire consumed power of the power network over an eleventh time interval in which consumed powers of the power grids change, based on the third prediction models and fourth prediction models of the power grids. The second server apparatus predicts a sixth predicted power using the sixth prediction model, based on the temporal variations in the entire consumed power of the power network over a twelfth time interval immediately before a current time, the sixth predicted power indicating the temporal variations in the entire consumed power of the power network over a thirteenth time interval immediately after the current time. The second server apparatus controls transmitting and receiving of power among the power grids by setting transmitting powers and receiving powers per a fourteenth time interval based on the fifth predicted power. The second server apparatus controls transmitting and receiving of power among the power grids by setting transmitting powers and receiving powers per a fifteenth time interval shorter than the fourteenth time interval based on the sixth predicted power.

INDUSTRIAL APPLICABILITY

According to the present disclosure, it is possible to determine magnitudes of charging power and discharging power of an battery apparatus of a customer so as to reduce a large and rapid change in power received from an electricity delivery system, the customer being connected to an electricity delivery system and provided with a plurality of load apparatuses and at least one battery apparatus.

REFERENCE SIGNS LIST 1, 1A to 1D, 1-1 to 1-4: CUSTOMER,
2: ELECTRICITY DELIVERY SYSTEM,
3, 3C to 3E: SERVER APPARATUS,
11: DISTRIBUTION BOARD,
12: ELECTRICITY METER,
13: BATTERY APPARATUS,
14: POWER GENERATOR APPARATUS,
15-1, 15-2: LOAD APPARATUS,
16, 16A to 16D: CONTROLLER APPARATUS,
17-1, 17-2: ELECTRICITY METER,
18: SENSOR,
21, 21A to 21C: CONTROLLER CIRCUIT,
22,22A, 22B: LONG-TERM PREDICTION MODELLING CIRCUIT,
23: LONG-TERM PREDICTOR CIRCUIT,
24, 24A, 24B: SHORT-TERM PREDICTION MODELLING CIRCUIT,
25, 25A, 25B: SHORT-TERM PREDICTOR CIRCUIT,
26: GENERATED POWER PREDICTION MODELLING CIRCUIT,
27: GENERATED POWER PREDICTOR CIRCUIT,
31: LEARNING MACHINE (ENTIRE CUSTOMER 1),
32: LEARNING MACHINE (INDIVIDUAL LOAD APPARATUS 15),
33: DETERMINER CIRCUIT,
34: PATTERN RECOGNIZER CIRCUIT,
41: INPUT LAYER,

42: MIDDLE LAYER,
43: OUTPUT LAYER,
100, 100-1 to 100-4: POWER GRID,
N1-1 to N1-P: NODES OF INPUT LAYER,
N2-1 to N2-Q, N(M−1)-1 to N(M−1)-R: NODES OF MIDDLE LAYER, and
NM-1 to NM-S: NODES OF OUTPUT LAYER.

The invention claimed is:

1. A controller apparatus for an battery apparatus of a customer, the customer being connected to an electricity delivery system and comprising a plurality of load apparatuses and at least one battery apparatus, the controller apparatus comprising:
a first predictor circuit that predicts a first predicted power using a first prediction model, the first prediction model indicating temporal variations in an entire consumed power of the customer for each moment of clock times, and the first predicted power indicating the temporal variations in the entire consumed power of the customer;
a second predictor circuit that predicts a second predicted power using a second prediction model, the second prediction model indicating the temporal variations in the entire consumed power of the customer over a first time interval before and after a change in a consumed power of each of the plurality of load apparatuses, the second predicted power being predicted based on the temporal variations in the entire consumed power of the customer over a second time interval immediately before a current time, and the second predicted power indicating the temporal variations in the entire consumed power of the customer over a third time interval immediately after the current time; and
a controller circuit that controls charging and discharging of the battery apparatus by setting a charging power or a discharging power per a fourth time interval based on the first predicted power, and controls discharging of the battery apparatus by setting a discharging power per a fifth time interval shorter than the fourth time interval based on the second predicted power.

2. The controller apparatus as claimed in claim 1,
wherein the second predictor circuit comprises a neural network having an input layer to which time-series data indicating the temporal variations in the entire consumed power of the customer over the second time interval is inputted, at least one middle layer, and an output layer from which time-series data indicating the temporal variations in the entire consumed power of the customer over the first time interval is outputted,
wherein the neural network is trained so as to exhibit the second prediction model.

3. The controller apparatus as claimed in claim 2,
wherein data indicating a type of the customer, including a house, a shop, and a plant, is further inputted to the input layer.

4. The controller apparatus as claimed in claim 2,
wherein data indicating a number of users of the customer or family members of the customer is further inputted to the input layer.

5. The controller apparatus as claimed in claim 2,
wherein data indicating models or model numbers of the load apparatuses is further inputted to the input layer.

6. The controller apparatus as claimed in claim 2,
wherein data indicating ON/OFF statuses or consumed powers of the load apparatuses is further inputted to the input layer.

7. The controller apparatus as claimed in claim 2,
wherein data indicating a status of the battery apparatus is further inputted to the input layer.

8. The controller apparatus as claimed in claim 2,
wherein data indicating behavior of a user of the customer is further inputted to the input layer.

9. The controller apparatus as claimed in claim 2,
wherein data indicating weather is further inputted to the input layer.

10. The controller apparatus as claimed in claim 2,
wherein data indicating date and time, or day of a week is further inputted to the input layer.

11. The controller apparatus as claimed in claim 1,
wherein the second prediction model indicates the temporal variations in the entire consumed power of the customer over the first time interval before and after turning on each of the plurality of load apparatuses.

12. The controller apparatus as claimed in claim 1, further comprising:
a first prediction modelling circuit that produces the first prediction model; and
a second prediction modelling circuit that produces the second prediction model.

13. The controller apparatus as claimed in claim 12,
wherein the first prediction model and the second prediction model are produced based on consumed powers of other customers.

14. The controller apparatus as claimed in claim 1,
wherein the controller apparatus communicates with an external server apparatus to obtain the first prediction model and the second prediction model from the server apparatus.

15. The controller apparatus as claimed in claim 1,
wherein the second prediction model is more frequently updated than the first prediction model.

16. The controller apparatus as claimed in claim 1,
wherein the controller circuit sets an upper limit to the discharging power based on the first predicted power, when setting the discharging power based on the second predicted power.

17. The controller apparatus as claimed in claim 1,
wherein the controller circuit
communicates with an external server apparatus to obtain data about an electricity rate from the server apparatus,
discharges the battery apparatus at a discharging power, when the electricity rate exceeds a first threshold, and
charges the battery apparatus at a charging power, when the electricity rate falls below a second threshold.

18. The controller apparatus as claimed in claim 1,
wherein the customer comprises a power generator apparatus.

19. The controller apparatus as claimed in claim 18,
wherein the power generator apparatus comprises solar cells, and
wherein the controller apparatus comprises a third predictor circuit that communicates with an external server apparatus to obtain weather data from the server apparatus, and predicts temporal variations in a generated power of the solar cells based on the weather data.

20. The controller apparatus as claimed in claim 1,
wherein the load apparatuses includes an electric vehicle.

21. An electric power management system for a customer connected to an electricity delivery system, the customer comprising:
a plurality of load apparatuses,
at least one battery apparatus, and
a controller apparatus, wherein the controller apparatus comprises:
  a first predictor circuit that predicts a first predicted power using a first prediction model, the first prediction model indicating temporal variations in an entire consumed power of the customer for each moment of clock times, and the first predicted power indicating the temporal variations in the entire consumed power of the customer;
  a second predictor circuit that predicts a second predicted power using a second prediction model, the second prediction model indicating the temporal variations in the entire consumed power of the customer over a first time interval before and after a change in a consumed power of each of the plurality of load apparatuses, the second predicted power being predicted based on the temporal variations in the entire consumed power of the customer over a second time interval immediately before a current time, and the second predicted power indicating the temporal variations in the entire consumed power of the customer over a third time interval immediately after the current time; and
  a controller circuit that controls charging and discharging of the battery apparatus by setting a charging power or a discharging power per a fourth time interval based on the first predicted power, and controls discharging of the battery apparatus by setting a discharging power per a fifth time interval shorter than the fourth time interval based on the second predicted power.

22. A power grid management system for a power grid including a plurality of customers connected to an electricity delivery system,
  wherein each of the plurality of customers comprises:
    a plurality of load apparatuses,
    at least one battery apparatus, and
    a controller apparatus,
  wherein the controller apparatus comprises:
    a first predictor circuit that predicts a first predicted power using a first prediction model, the first prediction model indicating temporal variations in an entire consumed power of the customer for each moment of clock times, and the first predicted power indicating the temporal variations in the entire consumed power of the customer;
    a second predictor circuit that predicts a second predicted power using a second prediction model, the second prediction model indicating the temporal variations in the entire consumed power of the customer over a first time interval before and after a change in a consumed power of each of the plurality of load apparatuses, the second predicted power being predicted based on the temporal variations in the entire consumed power of the customer over a second time interval immediately before a current time, and the second predicted power indicating the temporal variations in the entire consumed power of the customer over a third time interval immediately after the current time; and
    a controller circuit that controls charging and discharging of the battery apparatus by setting a charging power or a discharging power per a fourth time interval based on the first predicted power, and controls discharging of the battery apparatus by setting a discharging power per a fifth time interval shorter than the fourth time interval based on the second predicted power, and
  wherein the power grid further includes a first server apparatus that controls transmitting and receiving of power among the customers by controlling controller apparatuses of the customers.

23. The power grid management system as claimed in claim 22,
  wherein the first server apparatus
    produces a third prediction model indicating temporal variations in an entire consumed power of the power grid for each moment of clock times, based on first prediction models of the customers,
    predicts a third predicted power using the third prediction model, the third predicted power indicating the temporal variations in the entire consumed power of the power grid,
    produces a fourth prediction model indicating the temporal variations in the entire consumed power of the power grid over a sixth time interval in which consumed powers of the customers change, based on the first prediction models and second prediction models of the customers,
    predicts a fourth predicted power using the fourth prediction model, based on the temporal variations in the entire consumed power of the power grid over a seventh time interval immediately before a current time, the fourth predicted power indicating the temporal variations in the entire consumed power of the power grid over an eighth time interval immediately after the current time,
    controls transmitting and receiving of power among the customers by setting transmitting powers and receiving powers per a ninth time interval based on the third predicted power, and
    controls transmitting and receiving of power among the customers by setting transmitting powers and receiving powers per a tenth time interval shorter than the ninth time interval based on the fourth predicted power.

24. A power network management system for a power network including a plurality of power grids connected to an electricity delivery system,
  wherein each of the plurality of power grids includes a plurality of customers connected to the electricity delivery system,
  wherein each of the plurality of customers comprises:
    a plurality of load apparatuses,
    at least one battery apparatus, and
    a controller apparatus,
  wherein the controller apparatus comprises:
    a first predictor circuit that predicts a first predicted power using a first prediction model, the first prediction model indicating temporal variations in an entire consumed power of the customer for each moment of clock times, and the first predicted power indicating the temporal variations in the entire consumed power of the customer;
    a second predictor circuit that predicts a second predicted power using a second prediction model, the second prediction model indicating the temporal variations in the entire consumed power of the customer over a first time interval before and after a change in a consumed power of each of the plurality of load apparatuses, the second predicted power being predicted based on the temporal variations in the entire consumed power of the customer over a second time interval immediately before a current time, and the second predicted power indicating the temporal variations in the entire consumed power of the customer over a third time interval immediately after the current time; and a controller circuit that controls charging and discharging of the battery apparatus by setting a charging power or a discharging power per a fourth time interval based on the first predicted power, and controls discharging of the battery apparatus by setting a discharging power per a fifth time interval shorter than the fourth time interval based on the second predicted power, and wherein each of the plurality of power grids further includes a first server apparatus that controls transmitting and receiving of power among the customers by controlling controller apparatuses of the customers, wherein the first server apparatus produces a third prediction model indicating temporal variations in an entire consumed power of the power grid for each moment of clock times, based on first prediction models of the customers, predicts a third predicted power using the third prediction model, the third predicted power indicating the temporal variations in the entire consumed power of the power grid, produces a fourth prediction model indicating the temporal variations in the entire consumed power of the power grid over a sixth time interval in which consumed powers of the customers change, based on the first prediction models and second prediction models of the customers, predicts a fourth predicted power using the fourth prediction model, based on the temporal variations in the entire consumed power of the power grid over a seventh time interval immediately before a current time, the fourth predicted power indicating the temporal variations in the entire consumed power of the power grid over an eighth time interval immediately after the current time, controls transmitting and receiving of power among the customers by setting transmitting powers and receiving powers per a ninth time interval based on the third predicted power, and controls transmitting and receiving of power among the customers by setting transmitting powers and receiving powers per a tenth time interval shorter than the ninth time interval based on the fourth predicted power, and wherein the power network further includes a second server apparatus that controls transmitting and receiving of power among the power grids by controlling first server apparatuses of the power grids.

25. The power network management system as claimed in claim 24, wherein the second server apparatus produces a fifth prediction model indicating temporal variations in an entire consumed power of the power network for each moment of clock times, based on third prediction models of the power grids, predicts a fifth predicted power using the fifth prediction model, the fifth predicted power indicating the temporal variations in the entire consumed power of the power network, produces a sixth prediction model indicating the temporal variations in the entire consumed power of the power network over an eleventh time interval in which consumed powers of the power grids change, based on the third prediction models and fourth prediction models of the power grids, predicts a sixth predicted power using the sixth prediction model, based on the temporal variations in the entire consumed power of the power network over a twelfth time interval immediately before a current time, the sixth predicted power indicating the temporal variations in the entire consumed power of the power network over a thirteenth time interval immediately after the current time, controls transmitting and receiving of power among the power grids by setting transmitting powers and receiving powers per a fourteenth time interval based on the fifth predicted power, and controls transmitting and receiving of power among the power grids by setting transmitting powers and receiving powers per a fifteenth time interval shorter than the fourteenth time interval based on the sixth predicted power.

* * * * *